US012669462B2

(12) United States Patent
Yamashita et al.

(10) Patent No.: US 12,669,462 B2
(45) Date of Patent: Jun. 30, 2026

(54) ELECTROLYTE ANALYSIS TEST STRIP, TEST STRIP MANUFACTURING METHOD AND ELECTROLYTE ANALYSIS DEVICE

(71) Applicant: OMRON HEALTHCARE CO., LTD., Muko (JP)

(72) Inventors: Hideyuki Yamashita, Kyoto (JP); Tatsuya Kobayashi, Kyoto (JP); Maya Makita, Kyoto (JP); Kazuya Kitayama, Kyoto (JP); Satoshi Nakajima, Kyoto (JP)

(73) Assignee: OMRON HEALTHCARE CO., LTD., Kyoto (JP)

( * ) Notice: Subject to any disclaimer, the term of this patent is extended or adjusted under 35 U.S.C. 154(b) by 294 days.

(21) Appl. No.: 18/118,179

(22) Filed: Mar. 7, 2023

(65) Prior Publication Data

US 2023/0204531 A1    Jun. 29, 2023

Related U.S. Application Data

(63) Continuation of application No. PCT/JP2021/041317, filed on Nov. 10, 2021.

(30) Foreign Application Priority Data

Nov. 12, 2020    (JP) ................................. 2020-188893

(51) Int. Cl.
*G01N 27/27* (2006.01)
*G01N 27/333* (2006.01)
(52) U.S. Cl.
CPC ........... *G01N 27/27* (2013.01); *G01N 27/333* (2013.01)

(58) Field of Classification Search
CPC ..... G01N 27/27; G01N 27/307; G01N 27/333
See application file for complete search history.

(56) References Cited

U.S. PATENT DOCUMENTS 5,264,103 A    11/1993  Yoshioka et al.
2004/0140209 A1    7/2004  Choi et al.
(Continued)

FOREIGN PATENT DOCUMENTS

CN    1531650 A    9/2004
CN    102980926 A    3/2013
(Continued)

OTHER PUBLICATIONS

JP 6127460 machine translation (Year: 2017).*
(Continued)

*Primary Examiner* — C. Sun
(74) *Attorney, Agent, or Firm* — Keating & Bennett, LLP

(57) ABSTRACT
The electrolyte analysis test strip of the present invention includes a substrate extending in one direction. A first ion-sensitive film provided in a specific region on the one end side in the one direction and a first extraction electrode extending from the first ion-sensitive film to the other end side are provided on one main surface of the substrate. A second ion-sensitive film provided in a specific region on the one end side and a second extraction electrode extending from the second ion-sensitive film to the other end side are provided on the other main surface of the substrate. The first ion-sensitive film and the second ion-sensitive film each come into contact with an electrolyte to generate a first potential corresponding to a concentration of a first ion species and a second potential corresponding to a concentration of a second ion species, respectively.

7 Claims, 17 Drawing Sheets

(56) References Cited

U.S. PATENT DOCUMENTS

| | | | |
|---|---|---|---|
| 2013/0168247 A1 | 7/2013 | Iwamoto | |
| 2014/0209485 A1 | 7/2014 | Ohgami et al. | |

FOREIGN PATENT DOCUMENTS

| | | | |
|---|---|---|---|
| CN | 211179623 U | 8/2020 | |
| JP | 05-196596 A | 8/1993 | |
| JP | 07-113784 A | 5/1995 | |
| JP | 2014-095675 A | 5/2014 | |
| JP | 5809969 B2 | 11/2015 | |
| JP | 6127460 B2 | 5/2017 | |

OTHER PUBLICATIONS

CN 211179623 machine translation (Year: 2020).*
Official Communication issued in corresponding Chinese Patent Application No. 202180054220.0, mailed on Feb. 11, 2025, 8 pages.
Official Communication issued in International Patent Application No. PCT/JP2021/041317, mailed on Dec. 28, 2021.
English translation of Official Communication issued in corresponding International Patent Application No. PCT/JP2021/041317, mailed on May 19, 2023.
Official Communication issued in corresponding Brazilian Patent Application No. BR112023003701, mailed on Sep. 2, 2025, 4 pages.

\* cited by examiner

Fig. 3A1
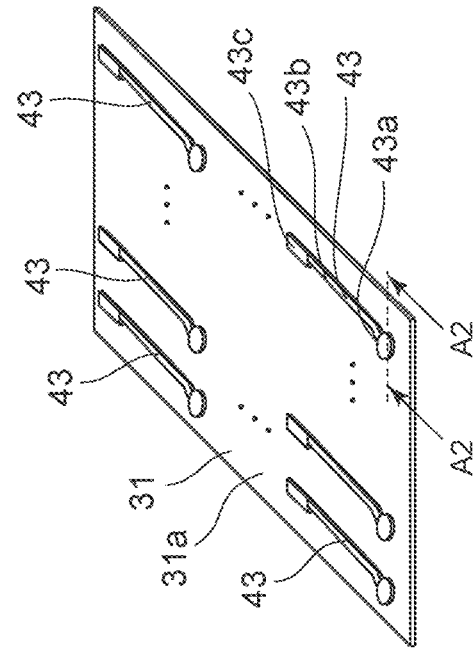
Fig. 3A2
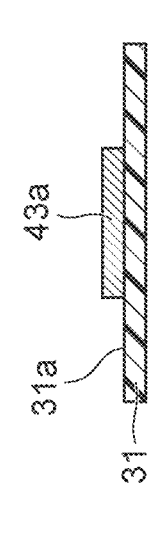
Fig. 3B1
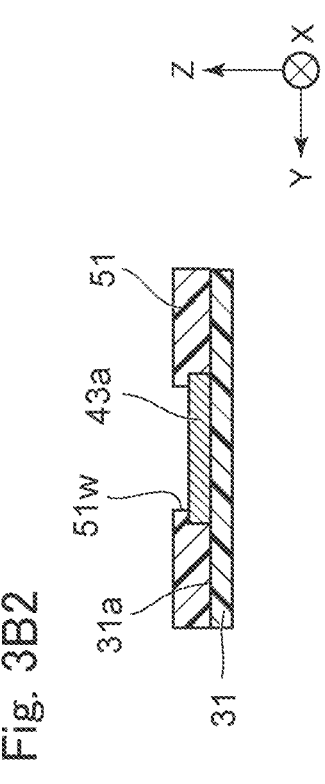
Fig. 3B2

Fig. 4B1
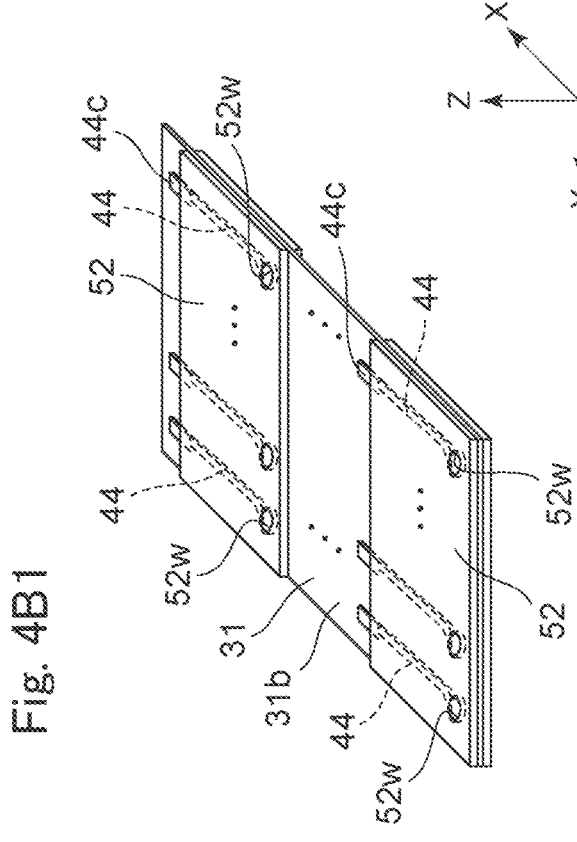
Fig. 4A1
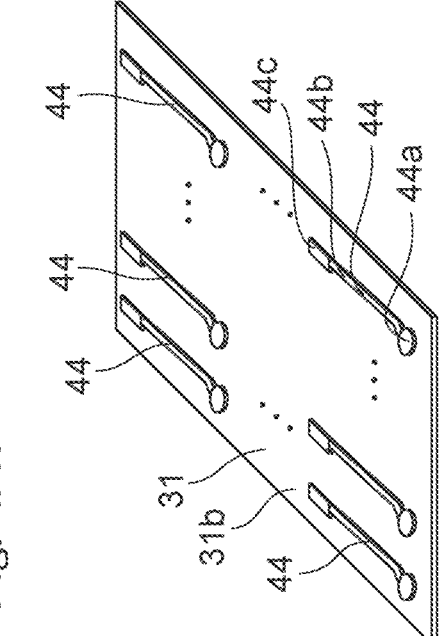
Fig. 4B2
Fig. 4A2
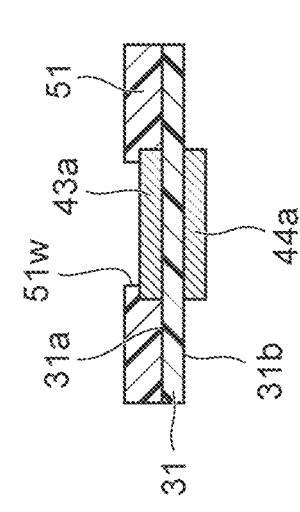

Fig. 5A1
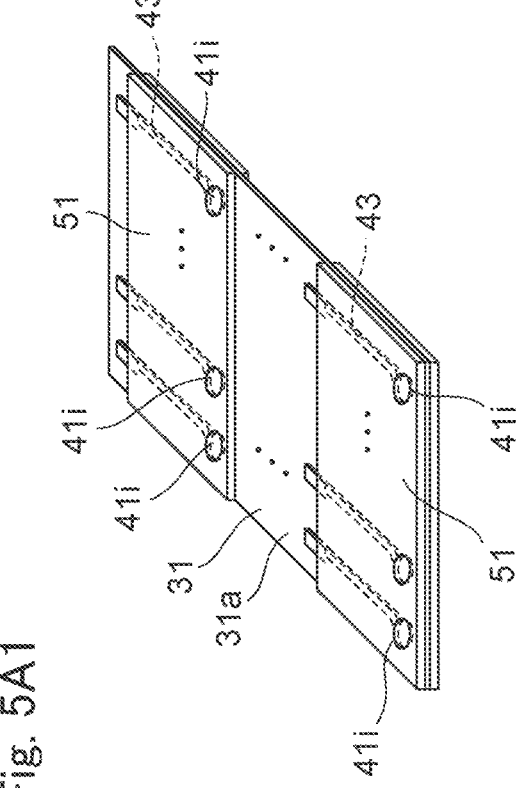
Fig. 5B1
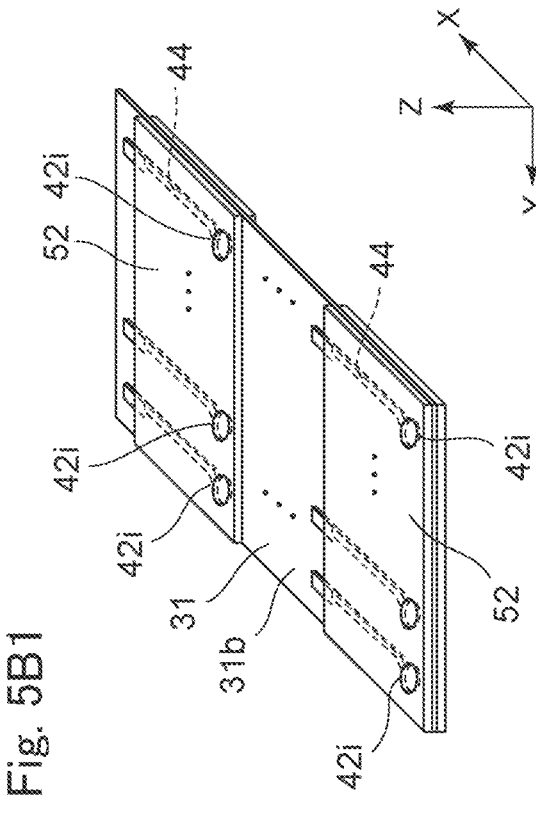
Fig. 5A2
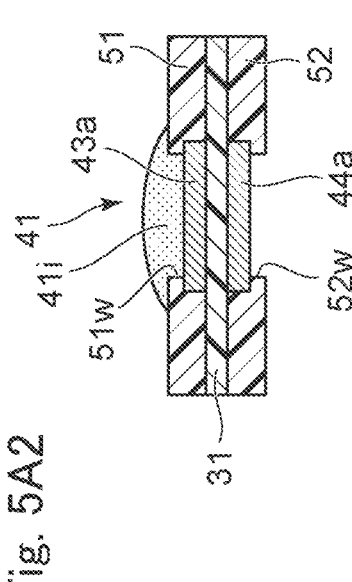
Fig. 5B2
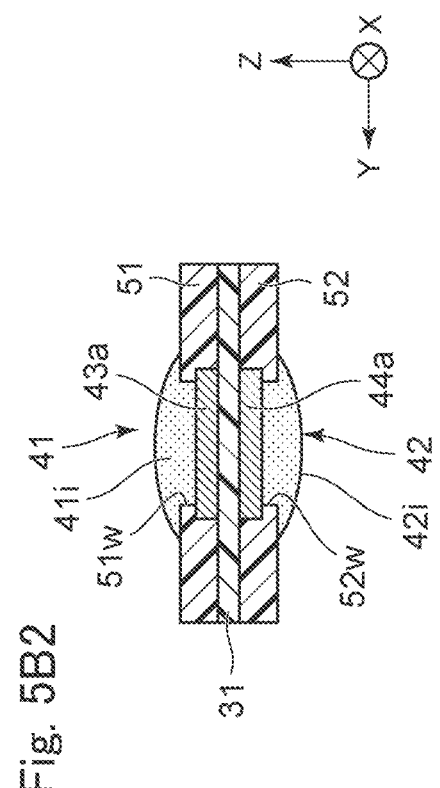

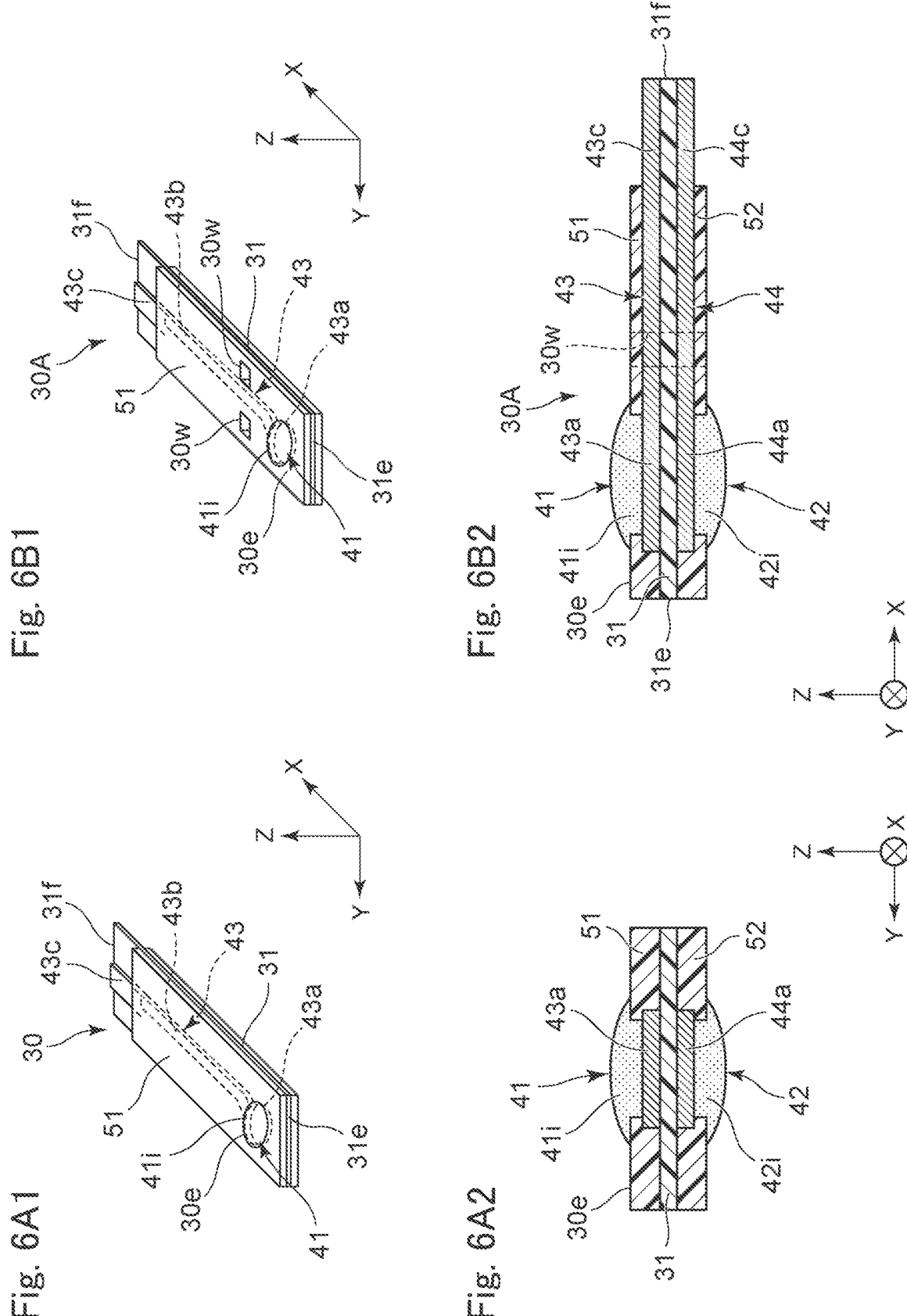
Fig. 6A1
Fig. 6B1
Fig. 6A2
Fig. 6B2

Fig. 7A1
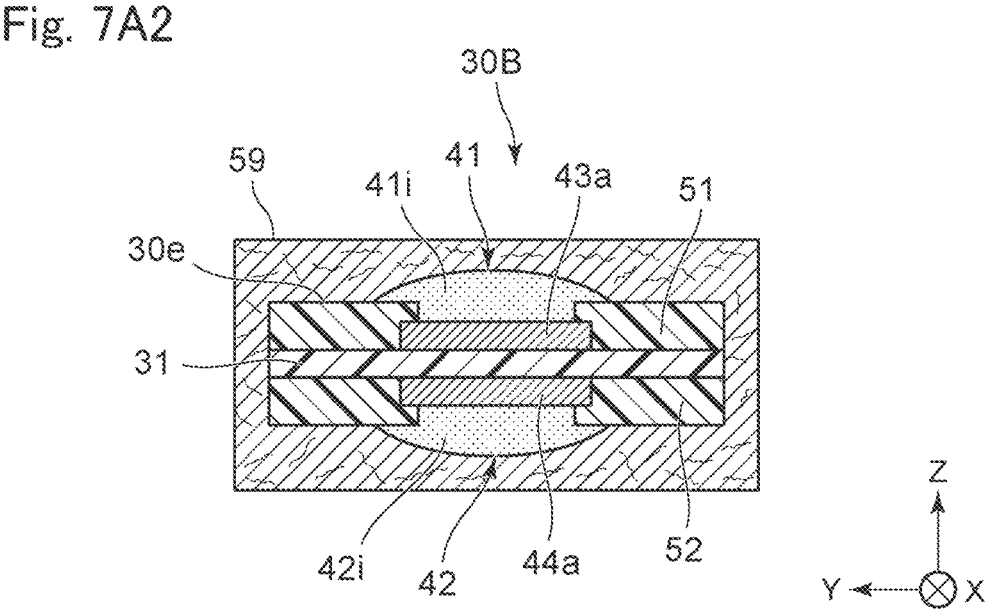
Fig. 7A2

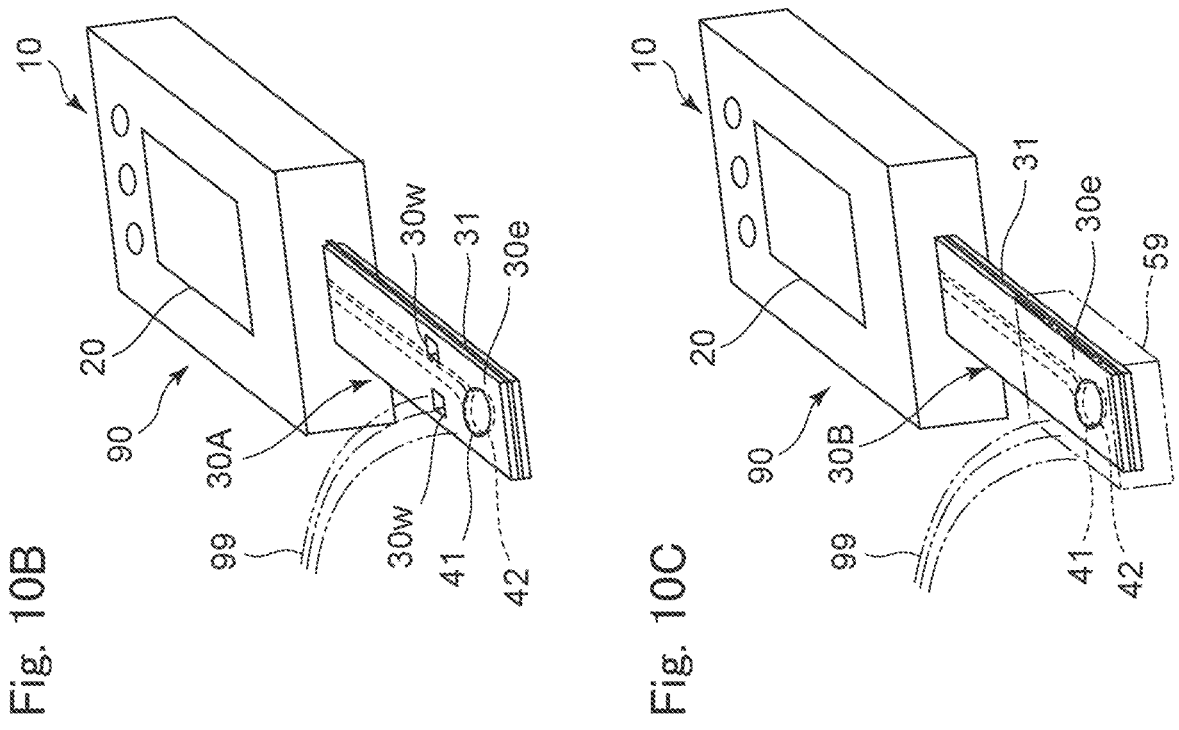
Fig. 10B
Fig. 10C
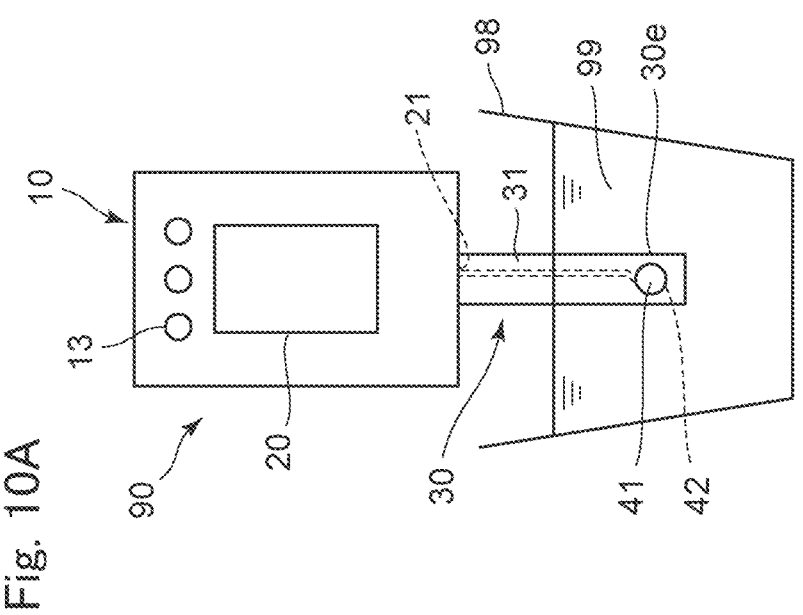
Fig. 10A

Fig. 13B1
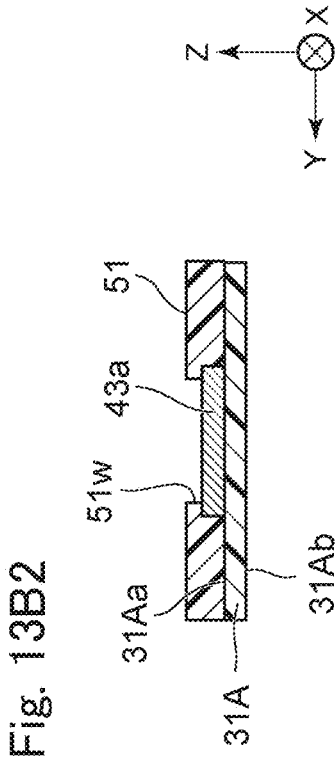
Fig. 13B2
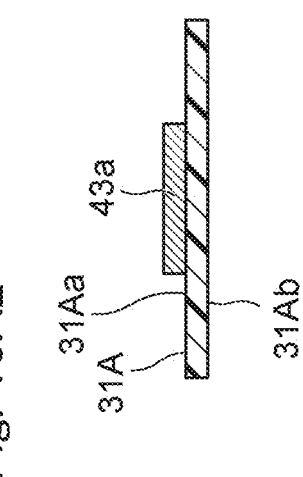
Fig. 13A1
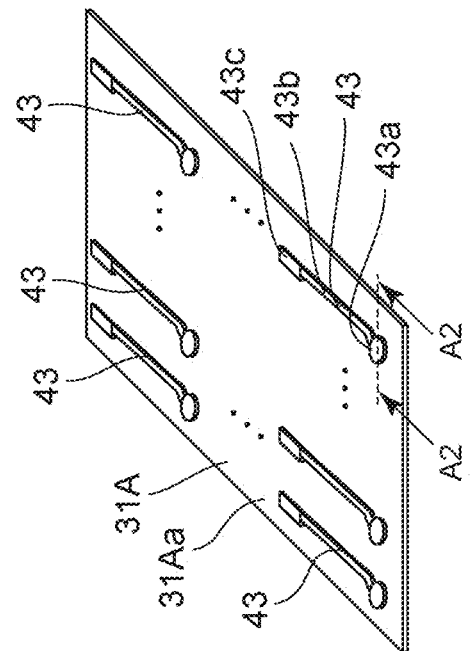
Fig. 13A2

Fig. 14B1
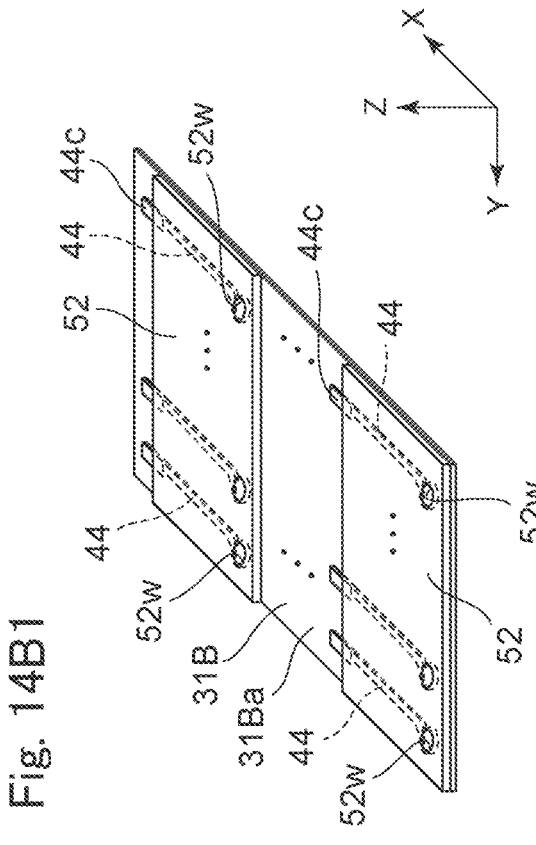
Fig. 14B2
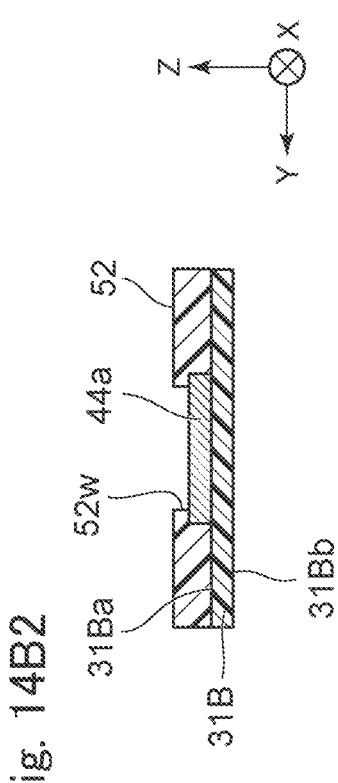
Fig. 14A1
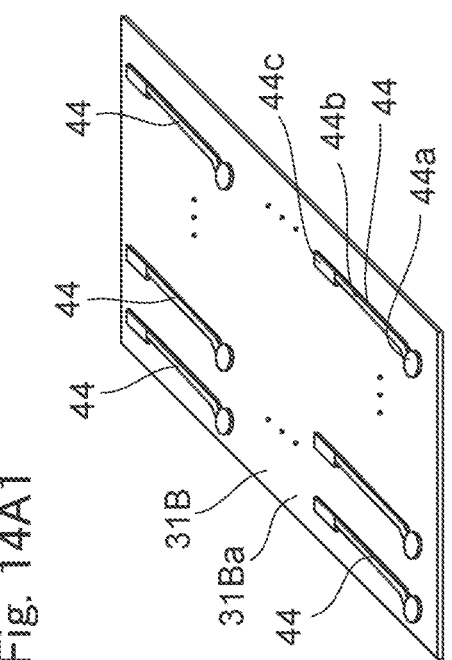
Fig. 14A2
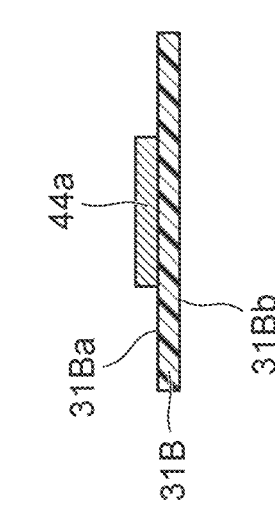

Fig. 15A1
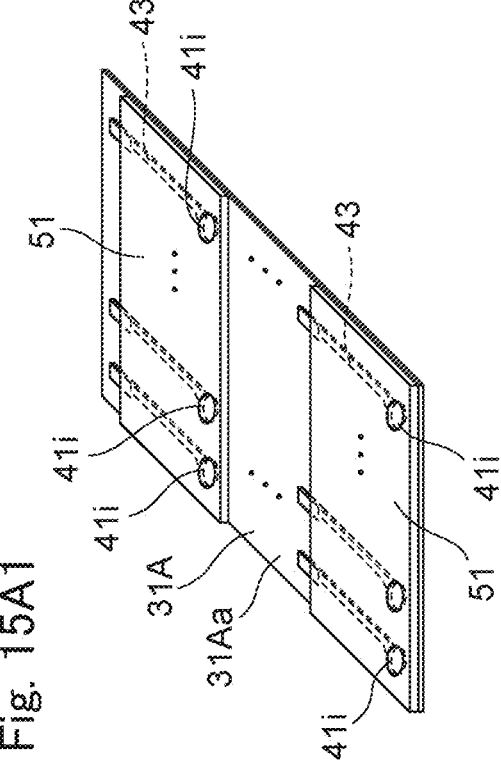
Fig. 15A2
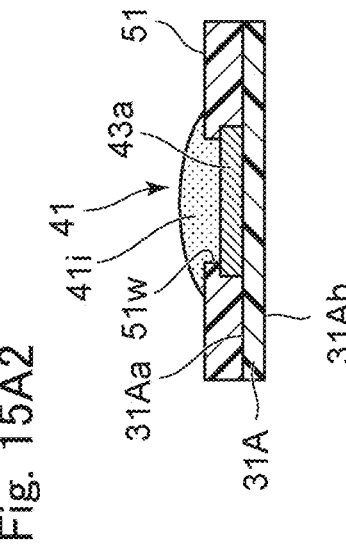
Fig. 15B1
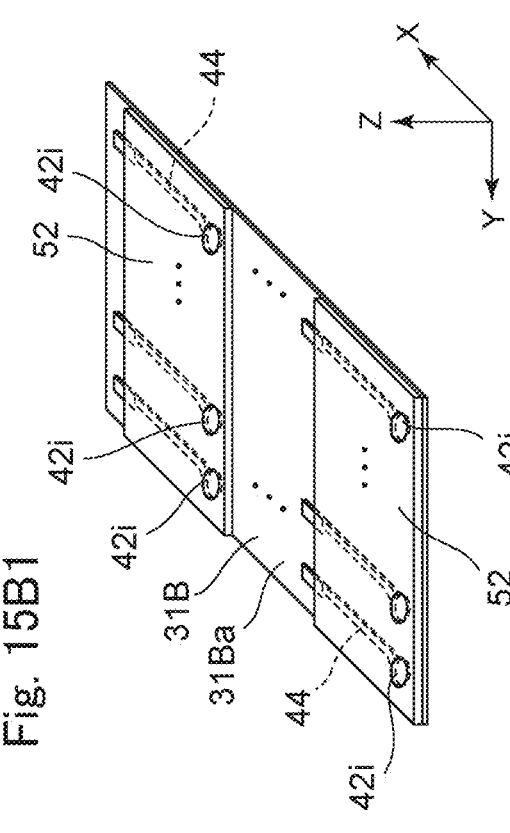
Fig. 15B2
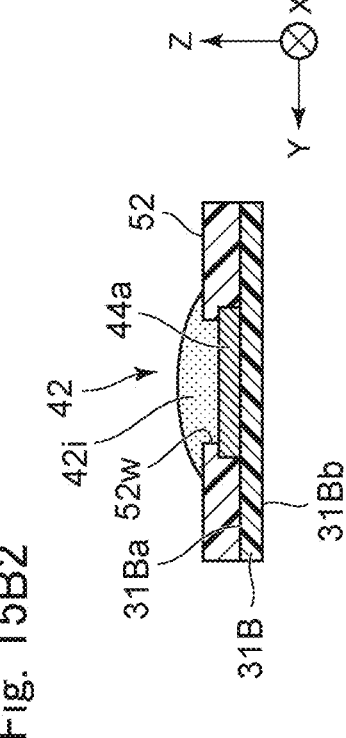

Fig. 16A1
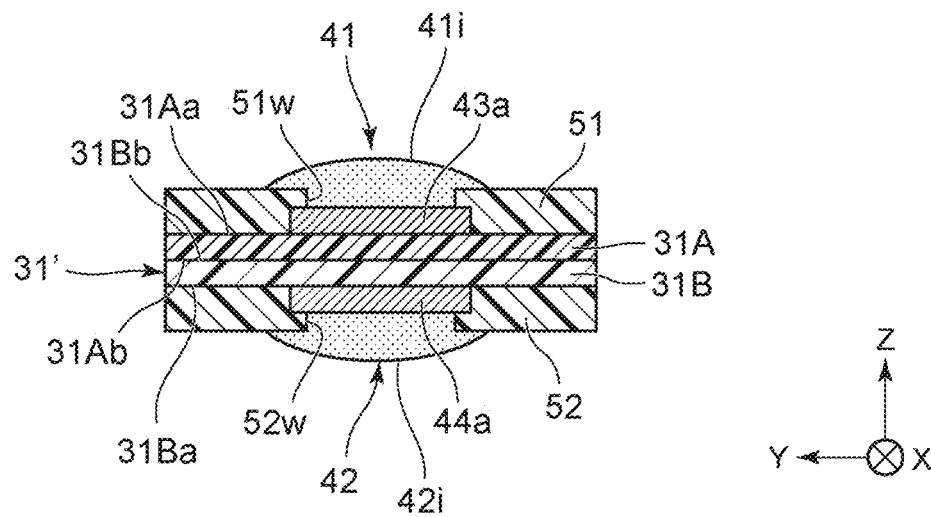
Fig. 16A2

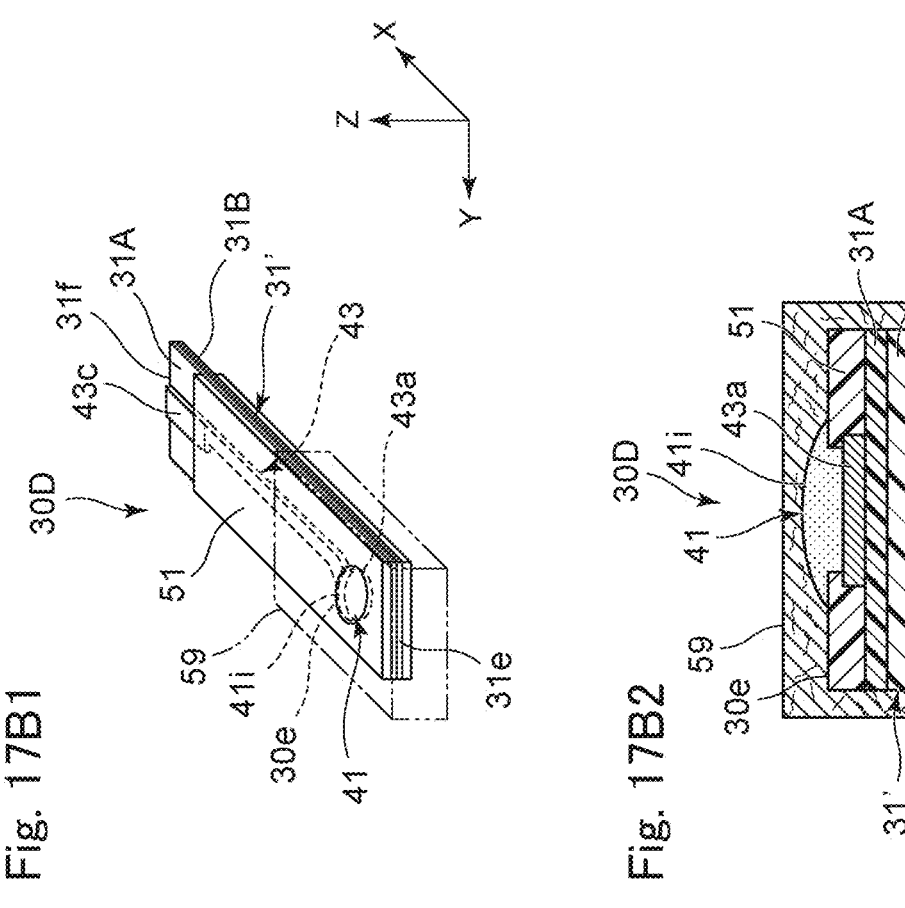
Fig. 17B1
Fig. 17B2
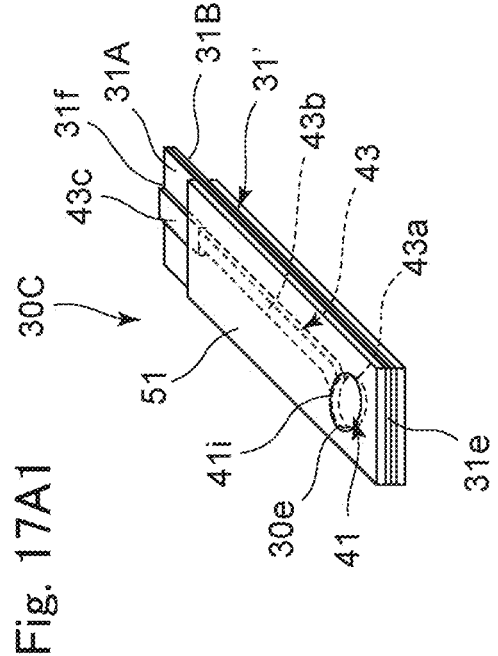
Fig. 17A1
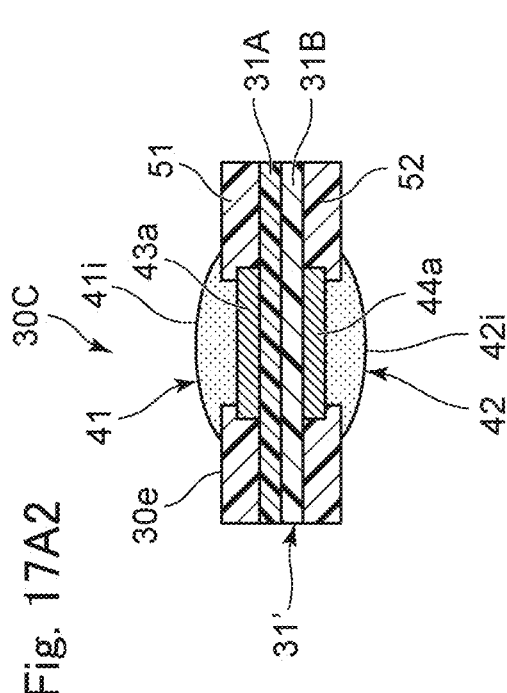
Fig. 17A2

ELECTROLYTE ANALYSIS TEST STRIP, TEST STRIP MANUFACTURING METHOD AND ELECTROLYTE ANALYSIS DEVICE

CROSS-REFERENCE TO RELATED APPLICATION

This application is based on an application No. 2020-188893 filed in Japan on Nov. 12, 2020, the entire content of which is hereby incorporated by reference.

TECHNICAL FIELD

The present invention relates to an electrolyte analysis test strip, and more particularly to a test strip for measuring a concentration ratio between a first ion species and a second ion species contained in an electrolyte. The present invention also relates to a test strip manufacturing method for producing such an electrolyte analysis test strip. The present invention also relates to an electrolyte analysis device that includes such an electrolyte analysis test strip and measures a concentration ratio between the first ion species and the second ion species.

BACKGROUND ART

As this type of electrolyte analysis test strip, an electrolyte analysis test strip has been heretofore known in which at a tip portion of one surface of an elongated substrate (laminated substrate), a circular sodium ion electrode and a circular potassium ion electrode are arranged side by side in a row along a longitudinal direction of the substrate as disclosed in, for example, Patent Literature 1 (Japanese Patent No. 5809969). The sodium ion electrode and the potassium ion electrode include a circular ion-sensitive film that selectively reacts with sodium ions and potassium ions, respectively, and a conductive film formed immediately below the ion-sensitive film.

An electrolyte analysis test strip is also known in which at a tip portion of one surface of an elongated substrate, a circular sodium ion electrode and a circular potassium ion electrode are arranged in a direction perpendicular to a longitudinal direction of the substrate (in a width direction) as disclosed in, for example, Patent Literature 2 (Japanese Patent No. 6127460). The sodium ion electrode and the potassium ion electrode include a circular ion-sensitive film that selectively reacts with sodium ions and potassium ions, respectively, and a conductive film formed immediately below the ion-sensitive film, as with those of the electrolyte analysis test strip of Patent Literature 1.

SUMMARY OF INVENTION

Each ion-sensitive film is formed by applying a material solution (solution containing an organic solvent) onto the substrate by an inkjet printing method or the like, and drying and curing the material solution. For this reason, the configurations of the test strips in Patent Literatures 1 and 2 have a problem that different material solutions spread and come into contact with each other after the material liquid is applied and before evaporation of the organic solvent during manufacturing stage. As a result, the characteristics of the ion-sensitive films formed are impaired.

For preventing this problem, Patent Literature 1 (Japanese Patent No. 5809969) suggests that the substrate is provided with a convex wall or a concave groove that separates between the sodium ion-sensitive film and the potassium ion-sensitive film. However, if the substrate is provided with such a convex wall or concave groove, the size of the substrate increases disadvantageously.

Therefore, an object of the present invention is to provide an electrolyte analysis test strip for measuring a concentration ratio between a first ion species and a second ion species contained in an electrolyte, which can be produced with a small size while material solutions for forming ion-sensitive films do not come into contact with each other. Another object of the present invention is to provide a test strip manufacturing method for producing such an electrolyte analysis test strip. Another object of the present invention is to provide an electrolyte analysis device that includes such an electrolyte analysis test strip and measures a concentration ratio between the first ion species and the second ion species.

In order to achieve the object, in a first aspect, an electrolyte analysis test strip of the present disclosure is an electrolyte analysis test strip for measuring a concentration ratio between a first ion species and a second ion species contained in an electrolyte, the electrolyte analysis test strip comprising:

a substrate extending in one direction;

a first ion-sensitive film that is provided in a specific region on one end side in the one direction on one main surface of the substrate and comes into contact with the electrolyte to generate a first potential corresponding to a concentration of the first ion species;

a first extraction electrode extending from the first ion-sensitive film to another end side opposite to the one end side on the one main surface;

a second ion-sensitive film that is provided in a specific region on the one end side on an other main surface opposite to the one main surface of the substrate, and comes into contact with the electrolyte to generate a second potential corresponding to a concentration of the second ion species; and a second extraction electrode extending from the second ion-sensitive film to the other end side on the other main surface, wherein the substrate includes a first substrate and a second substrate laminated and bonded to each other, the one main surface is one being farther from the second substrate out of two main surfaces of the first substrate, and the other main surface is one being farther from the first substrate out of two main surfaces of the second substrate.

In the present specification, the "one main surface" and the "other main surface" of a substrate refer to a pair of plate surfaces that spatially extend, and are different from end surfaces.

The "one end side" refers to a side closer to the one end out of the one end and the other end in the one direction. The "other end side" refers to a side closer to the other end out of the one end and the other end in the one direction.

In a second aspect, a test strip manufacturing method of the present disclosure is a test strip manufacturing method for producing the electrolyte analysis test strip of the first aspect, the method comprising:

providing the first substrate and the second substrate;

forming the first extraction electrode extending from the specific region on the one end side to the other end side opposite to the one end side in the one direction on a surface as the one main surface of the first substrate;

forming the second extraction electrode extending from the specific region on the one end side to the other end side on a surface as the other main surface of the second substrate;

then applying a material solution of the first ion-sensitive film onto a portion of the first extraction electrode, the portion formed in the specific region, on the surface as the one main surface of the first substrate, and drying and/or curing the applied material solution to form the first ion-sensitive film;

applying a material solution of the second ion-sensitive film onto a portion of the second extraction electrode, the portion being formed in the specific region, on the surface as the other main surface of the second substrate, and drying and/or curing the applied material solution to form the second ion-sensitive film; and subsequently laminating and bonding a back surface opposite to the surface as the one main surface of the first substrate and a back surface opposite to the surface as the other main surface of the second substrate to each other.

In a third aspect, an electrolyte analysis test strip of the present disclosure is an electrolyte analysis test strip for measuring a concentration ratio between a first ion species and a second ion species contained in an electrolyte, the electrolyte analysis test strip comprising:

a substrate extending in one direction;

a first ion-sensitive film that is provided in a specific region on one end side in the one direction on one main surface of the substrate and comes into contact with the electrolyte to generate a first potential corresponding to a concentration of the first ion species;

a first extraction electrode extending from the first ion-sensitive film to another end side opposite to the one end side on the one main surface;

a second ion-sensitive film that is provided in a specific region on the one end side on an other main surface opposite to the one main surface of the substrate, and comes into contact with the electrolyte to generate a second potential corresponding to a concentration of the second ion species; and a second extraction electrode extending from the second ion-sensitive film to the other end side on the other main surface, wherein the substrate has, on the one end side in the one direction, a through-hole extending from the one main surface to the other main surface in a region other than a region occupied by the first and second ion-sensitive films and the first and second extraction electrodes.

In a fourth aspect, an electrolyte analysis test strip of the present disclosure is an electrolyte analysis test strip for measuring a concentration ratio between a first ion species and a second ion species contained in an electrolyte, the electrolyte analysis test strip comprising:

a substrate extending in one direction;

a first ion-sensitive film that is provided in a specific region on one end side in the one direction on one main surface of the substrate and comes into contact with the electrolyte to generate a first potential corresponding to a concentration of the first ion species;

a first extraction electrode extending from the first ion-sensitive film to another end side opposite to the one end side on the one main surface;

a second ion-sensitive film that is provided in a specific region on the one end side on an other main surface opposite to the one main surface of the substrate, and comes into contact with the electrolyte to generate a second potential corresponding to a concentration of the second ion species;

a second extraction electrode extending from the second ion-sensitive film to the other end side on the other main surface; and a permeable member formed of a material permeable to the electrolyte, wherein the permeable member spatially continuously covers the first ion-sensitive film and the second ion-sensitive film with lying across an end surface of the substrate from the one main surface to the other main surface.

The "electrolyte-permeable material" refers to, for example, wound fiber (thread), sponge, tissue paper, gauze, or absorbent cotton.

In another aspect, an electrolyte analysis device of the present disclosure is an electrolyte analysis device for measuring a concentration ratio between a first ion species and a second ion species contained in an electrolyte, the electrolyte analysis device comprising:

the electrolyte analysis test strip described above; and a main body, the main body including a connector into which the other end side of the electrolyte analysis test strip is inserted, the connector including a first contact electrode and a second contact electrode that are in contact with the first extraction electrode and the second extraction electrode, respectively, and a calculation unit that calculates a concentration ratio between the first ion species and the second ion species contained in the electrolyte based on a potential difference between the first potential and the second potential obtained through the first contact electrode and the second contact electrode of the connector when the first and second ion-sensitive films of the electrolyte analysis test strip come into contact with the electrolyte.

BRIEF DESCRIPTION OF DRAWINGS

The present invention will become more fully understood from the detailed description given hereinbelow and the accompanying drawings which are given by way of illustration only, and thus are not limitative of the present invention, and wherein:

FIGS. 3A1 and 3B1 are perspective views showing configurations of in-process articles in some steps included in the manufacturing process. FIGS. 3A2 and 3B2 are views showing cross-sections of part of the in-process articles in FIGS. 3A1 and 3B1, respectively.

FIGS. 4A1 and 4B1 are perspective views showing configurations of in-process articles in some steps included in the manufacturing process. FIGS. 4A2 and 4B2 are views showing cross-sections of part of the in-process articles in FIGS. 4A1 and 4B1, respectively.

FIGS. 5A1 and 5B1 are perspective views showing configurations of in-process articles in some steps included in the manufacturing process. FIGS. 5A2 and 5B2 are views showing cross-sections of part of the in-process articles in FIGS. 5A1 and 5B1, respectively.

5

Figure 1B:
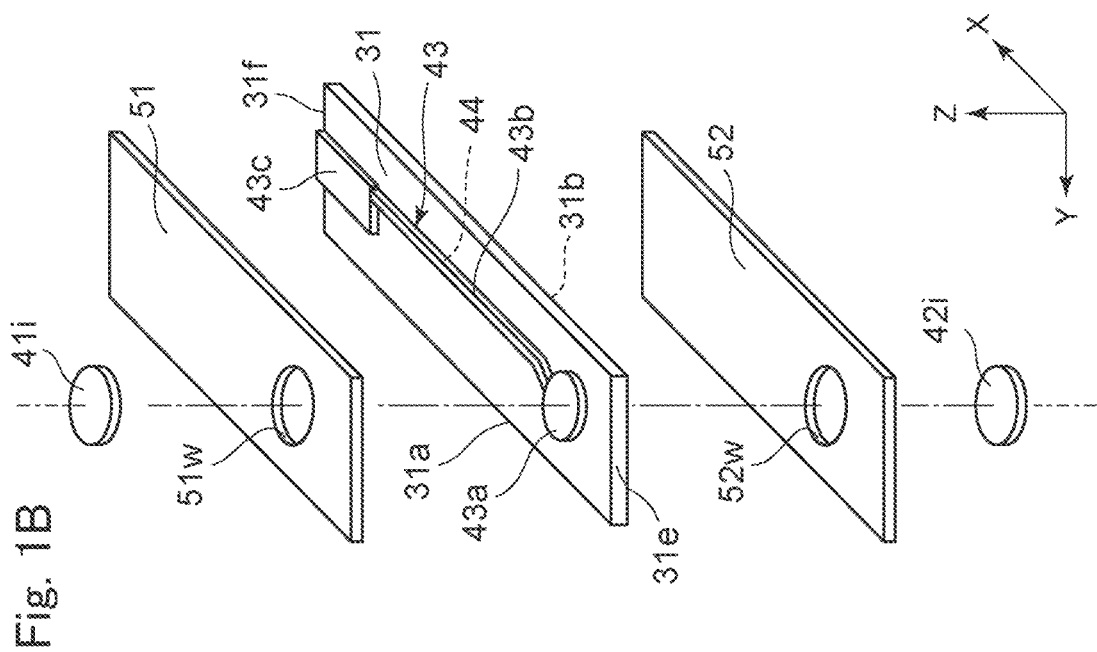
FIG. 1B is a perspective view showing the test strip in an exploded state.

FIG. 6A1 is a perspective view showing a configuration of a test strip produced by the above-described manufacturing process. FIG. 6A2 is a view showing a cross-section of a tip portion of the test strip in FIG. 6A1. FIG. 6B1 is a perspective view showing a configuration in which through-holes are formed in the test strip of FIG. 6A1. FIG. 6B2 is a view showing a cross-section of the test strip of FIG. 6B1, which is taken along a longitudinal direction (X direction).

FIG. 7A1 is a perspective view showing a configuration in which tip portion of the test strip of FIG. 6A1 is covered with a permeable member. FIG. 7A2 is a view showing a cross-section of the tip portion of the test strip in FIG. 7A1.

Figure 8:
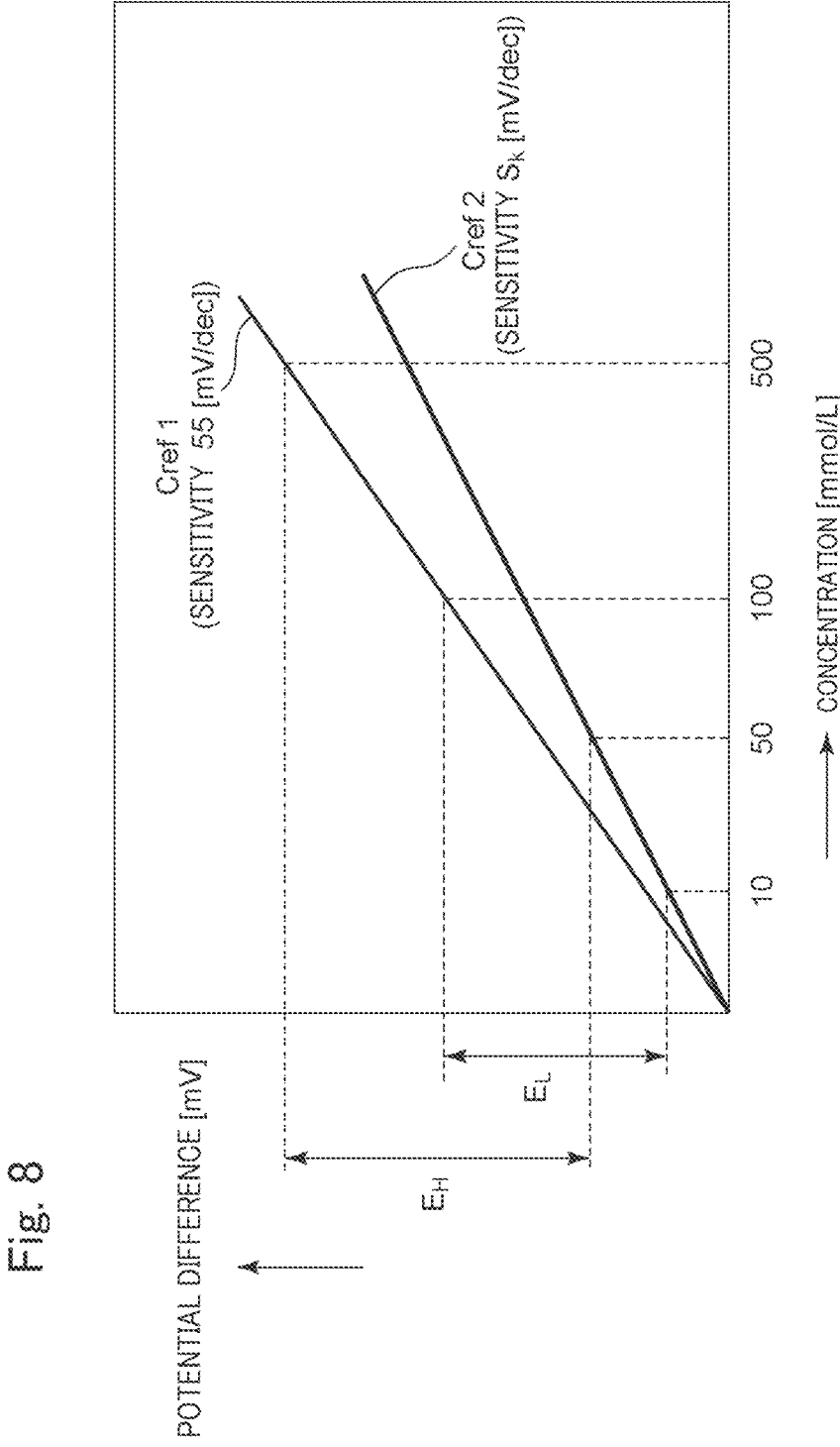

FIG. 8 is a diagram illustrating a way for setting an allowable criterial range for a sensitivity difference between a sodium ion electrode as a first ion-sensitive electrode and a potassium ion electrode as a second ion-sensitive electrode.

Figure 9A:
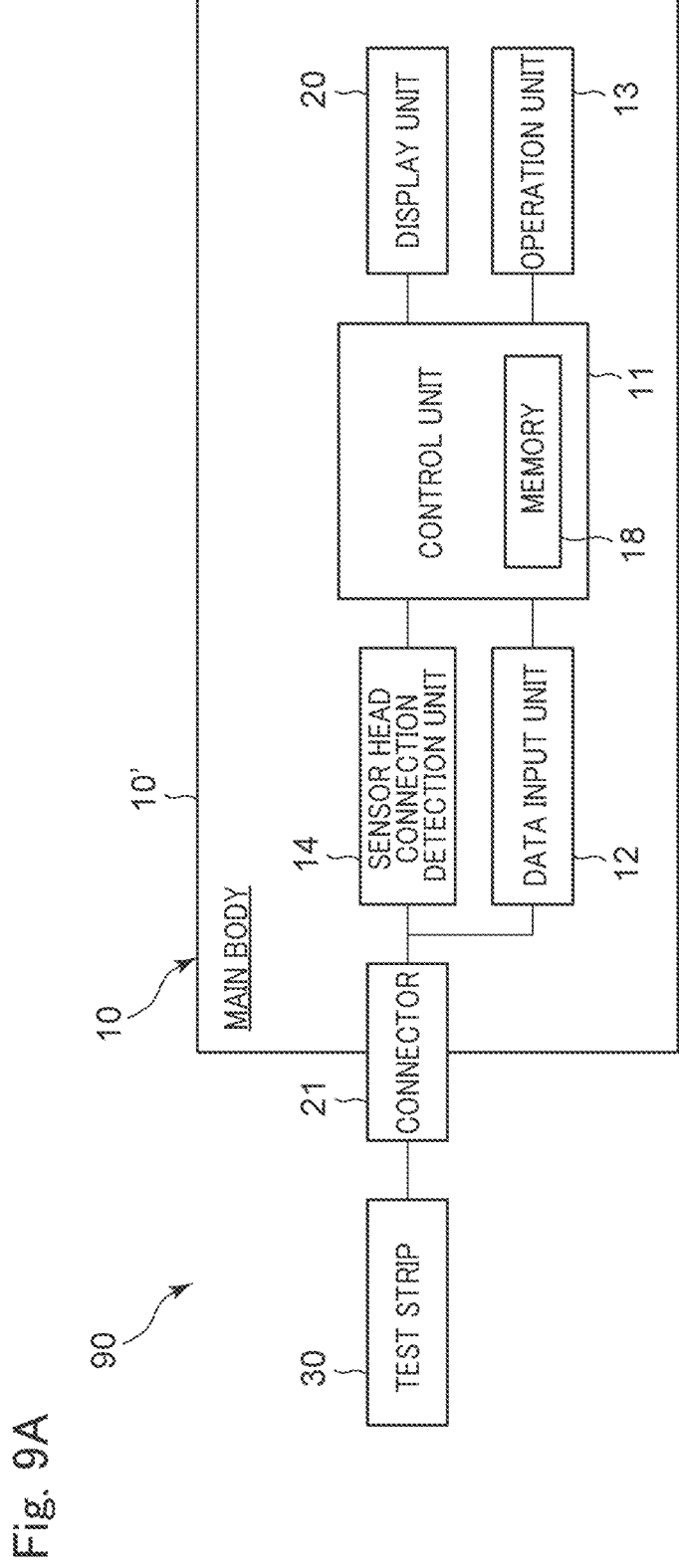
Figure 9B:
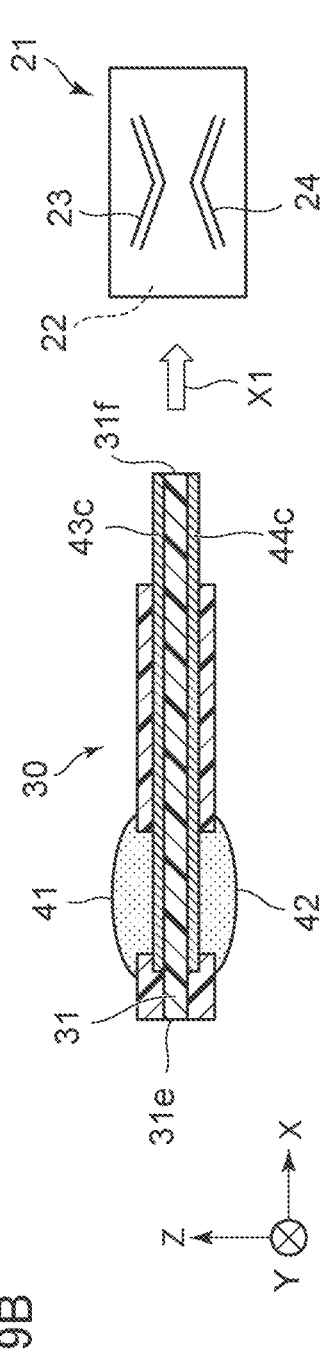

FIG. 9A is a diagram showing a block configuration of an electrochemical sensor as an electrolyte analysis device according to an embodiment of the present invention. FIG. 9B is a diagram illustrating a way for connecting the test strip to the main body of the electrochemical sensor.

FIG. 10A is a diagram showing a manner in which a user measures a concentration ratio between sodium ions and potassium ions by immersing a tip portion of the test strip in urine contained in a container. FIG. 10B is a diagram showing a manner in which a user measures a concentration ratio between sodium ions and potassium ions by sprinkling urine over a tip portion of the test strip in which a through-hole is formed. FIG. 10C is a diagram showing a manner in which a user measures a concentration ratio between sodium ions and potassium ions by sprinkling urine over a tip portion of the test strip covered with a permeable member.

Figure 11B:
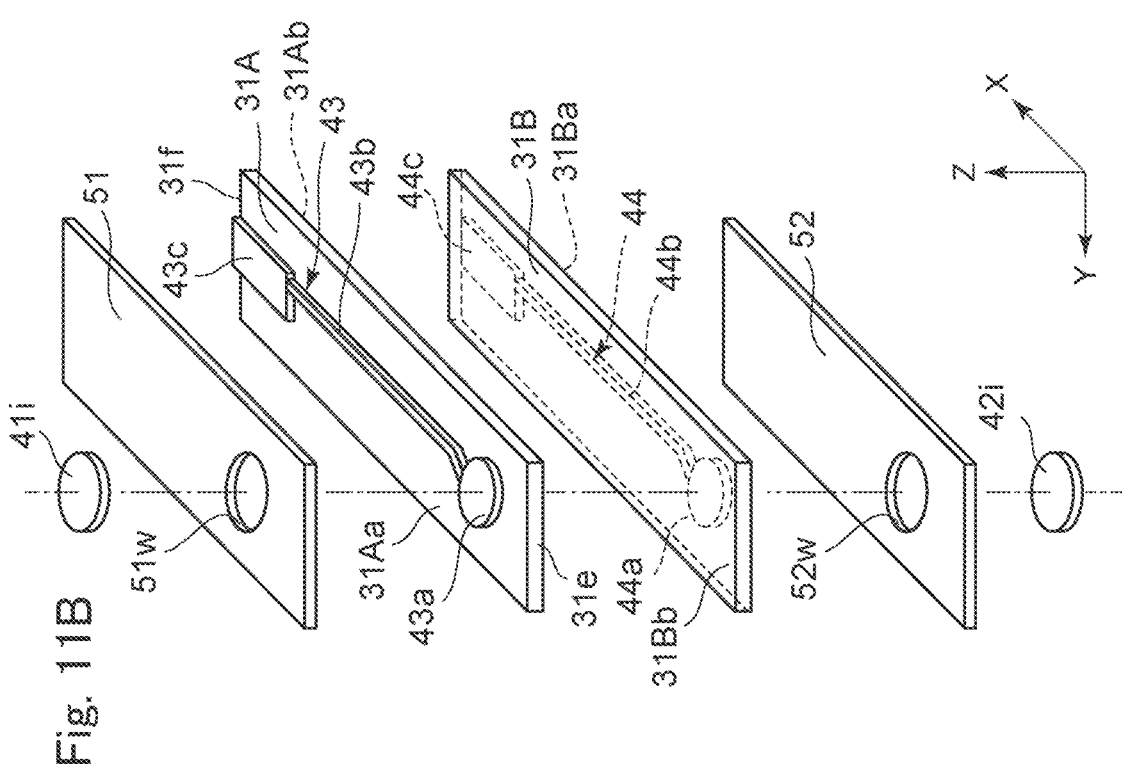
Figure 11A:
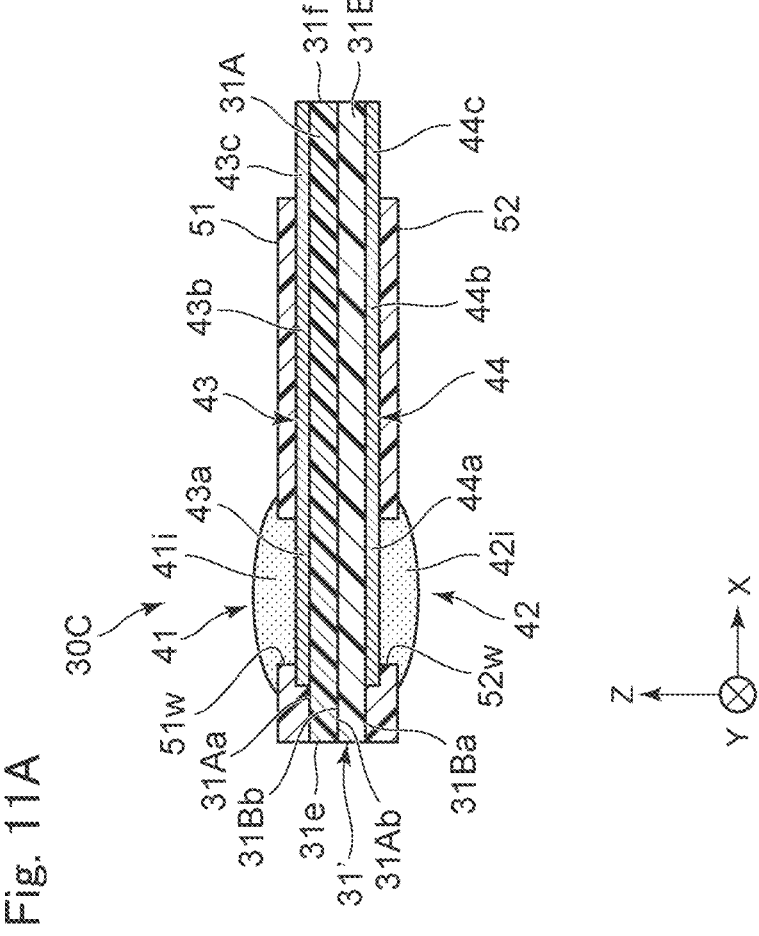

FIG. 11A is a view showing a cross-section of an electrolyte analysis test strip according to a second embodiment of the present invention, which is taken along a longitudinal direction (X direction). FIG. 11B is a perspective view showing the test strip in an exploded state.

Figure 12:
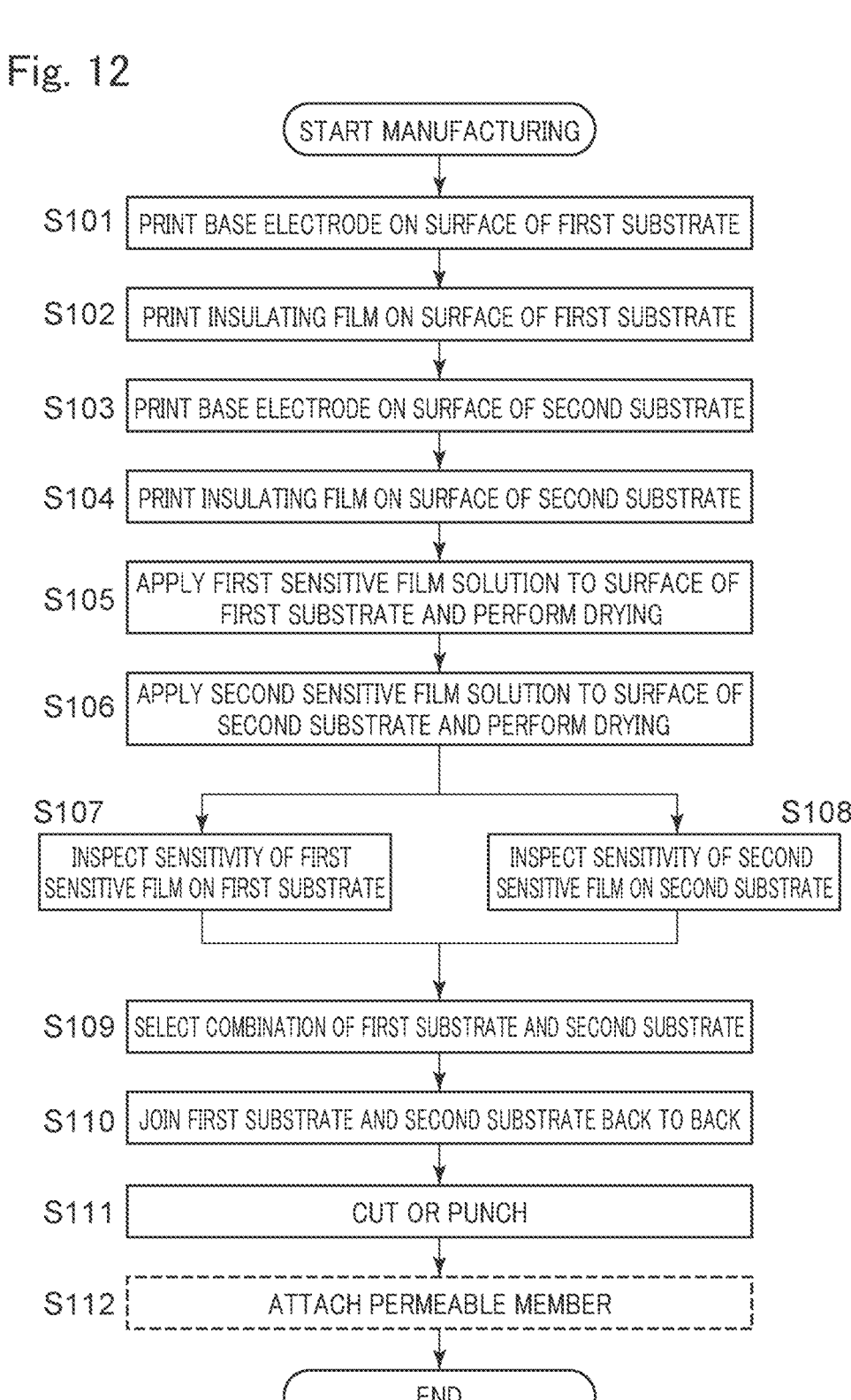

FIG. 12 is a chart showing a flow of a manufacturing process for producing the test strip of FIG. 11A.

FIGS. 13A1 and 13B1 are perspective views showing configurations of in-process articles in some steps included in the manufacturing process. FIGS. 13A2 and 13B2 are views showing cross-sections of part of the in-process articles in FIGS. 13A1 and 13B1, respectively.

FIGS. 14A1 and 14B1 are perspective views showing configurations of in-process articles in some steps included in the manufacturing process. FIGS. 14A2 and 14B2 are views showing cross-sections of part of the in-process articles in FIGS. 14A1 and 14B1, respectively.

FIGS. 15A1 and 15B1 are perspective views showing configurations of in-process articles in some steps included in the manufacturing process. FIGS. 15A2 and 15B2 are views showing cross-sections of part of the in-process articles in FIGS. 15 A1 and 15B1, respectively.

FIG. 16A1 is a perspective view showing a manner of a step of joining the first substrate and the second substrate back to back, which is included in the manufacturing process. FIG. 16A2 is a view showing a cross-section of part of the in-process articles in FIG. 16A1.

FIG. 17A1 is a perspective view showing a configuration of a test strip produced by the above-described manufacturing process. FIG. 17A2 is a view showing a cross-section of a tip portion of the test strip of FIG. 17A1, which is taken along a width direction (Y direction). FIG. 17B1 is a perspective view showing a configuration in which the tip portion of the test strip of FIG. 17A1 is covered with a permeable member. FIG. 17B2 is a view showing a cross-section of a tip portion of the test strip in FIG. 17B1.

6

DESCRIPTION OF EMBODIMENTS

Hereinafter, embodiments of the present invention will be described in detail with reference to the drawings.

First Embodiment

Figure 1A:
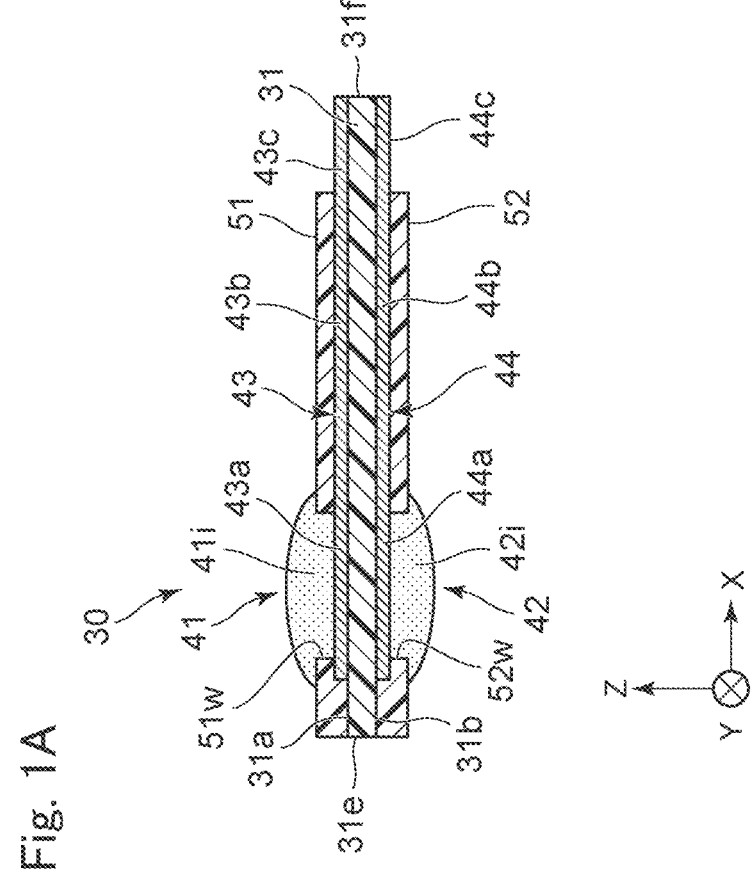
FIG. 1A is a view showing a cross-section of an electrolyte analysis test strip according to a first embodiment of the present invention, which is taken along a longitudinal direction (X direction).
Figure 2:
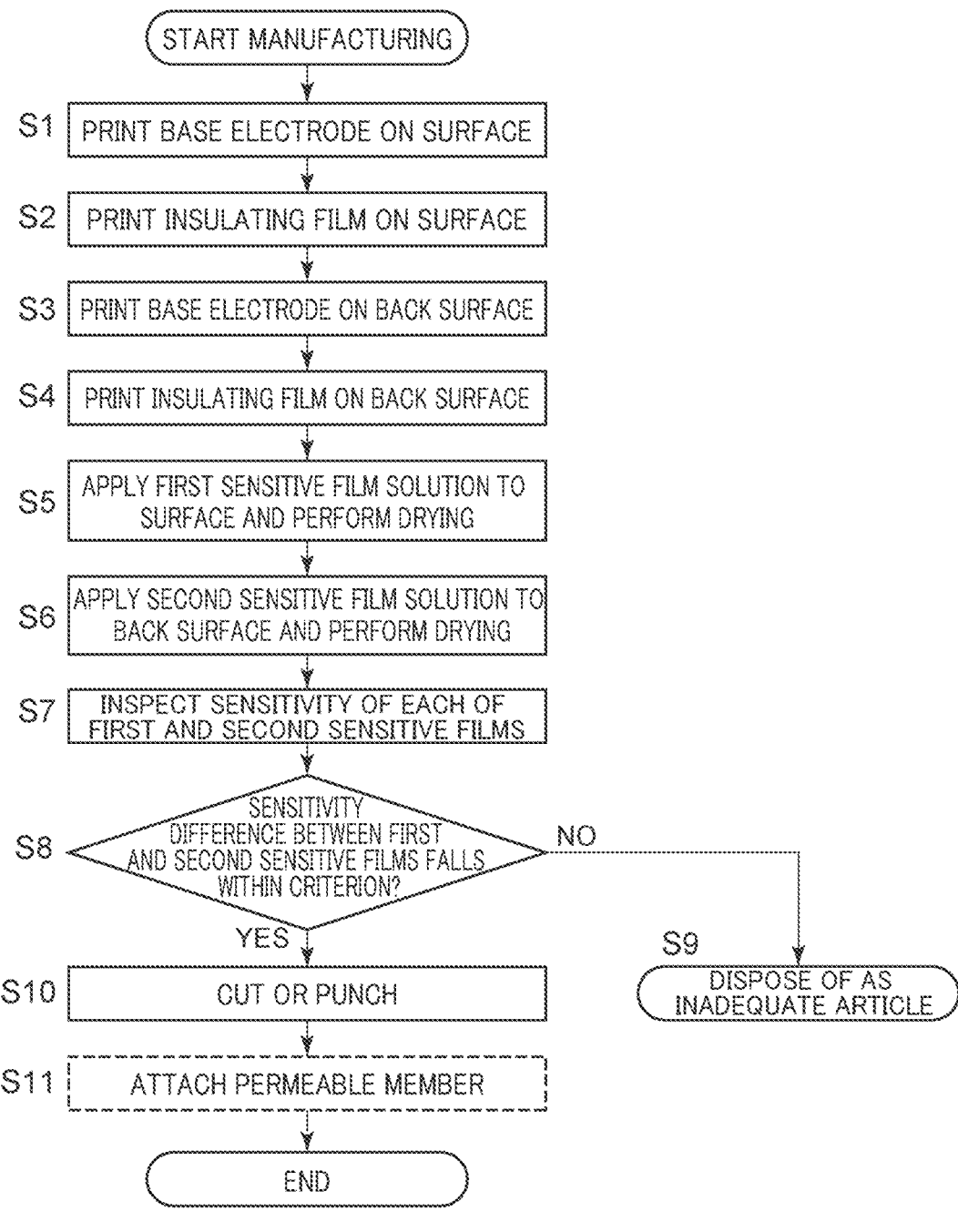
FIG. 2 is a chart showing a flow of a manufacturing process for producing the test strip.

FIG. 1A shows a cross-section of an electrolyte analysis test strip 30 according to the first embodiment of the present invention, which is taken along a longitudinal direction (X direction). FIG. 1B shows the test strip 30 in an exploded state. In some drawings described later, an XYZ orthogonal coordinate system is also shown as appropriate for easy understanding. The test strip 30 is used for measuring a concentration ratio between a first ion species and a second ion species contained in an electrolyte. In this example, the electrolyte is urine, the first ion species is a sodium ion, and the second ion species is a potassium ion.

As can be seen from FIGS. 1A and 1B, the test strip 30 includes one substrate 31 elongatedly extends in an X direction as one direction, a first extraction electrode 43 formed on a surface 31a as one main surface of the substrate 31, and a second extraction electrode 44 formed on a back surface 31b as the other main surface opposite to the surface 31a of the substrate 31.

The first extraction electrode 43 has, on the surface 31a of the substrate 31, a pattern including a base portion 43a provided in a circular specific region on the one end 31e side in the X direction, a lead portion 43b elongatedly extending from the base portion 43a to the other end 31f side, and an electrode pad portion 43c which is provided on the other end 31f side in continuation to the lead portion 43b and has a width larger than that of the lead portion 43b. The second extraction electrode 44 has, on the back surface 31b of the substrate 31, a pattern including a base portion 44a provided in a circular specific region on the one end 31e side in the X direction, a lead portion 44b elongatedly extending from the base portion 44a to the other end 31f side, and an electrode pad portion 44c which is provided on the other end 31f side in continuation to the lead portion 44b and has a width larger than that of the lead portion 44b. The pattern of the first extraction electrode 43 and the pattern of the second extraction electrode 44 are set to coincide to each other in the X-Y plane where the substrate 31 extends.

The "one end 31e side" refers to a side closer to the one end 31e out of the one end 31e and the other end 31f in the X direction. The "other end 31f side" refers to a side closer to the other end 31f out of the one end 31e and the other end 31f in the X direction.

The surface 31a of the substrate 31 is generally covered with an insulating film 51 as a protecting layer. The insulating film 51 covers a portion from the one end 31e to just a boundary between the lead portion 43b and the electrode pad portion 43c in the X direction. Similarly, the back surface 31b of the substrate 31 is generally covered with an insulating film 52 as a protecting layer. The insulating film 52 covers a portion from the one end 31e to just a boundary between the lead portion 44b and the electrode pad portion 44c in the X direction. Therefore, the lead portions 43b and 44b are protected by the insulating films 51 and 52, respectively. On the other hand, the electrode pad portions 43c and 44c are exposed from the insulating films 51 and 52 to be electrically connected to a connector of the main body described later.

On the surface 31a side of the substrate 31, the insulating film 51 has a circular opening 51w corresponding to the base portion 43a of the first extraction electrode 43. Through the opening 51w, a sodium ion-sensitive film 41i as a first ion-sensitive film is provided on the base portion 43a so as to be in electrical contact with the base portion 43a. Similarly, on the back surface 31b of the substrate 31, the insulating film 52 has a circular opening 52w corresponding to the base portion 44a of the second extraction electrode 44. Through the opening 52w, a potassium ion-sensitive film 42i as a second ion-sensitive film is provided on the base portion 44a so as to be in electrical contact with the base portion 44a. Hereinafter, the base portion 43a and the sodium ion-sensitive film 41i are collectively referred to as a sodium ion-sensitive film 41i are collectively referred to as a sodium ion-sensitive electrode 41. The base portion 44a and the potassium ion-sensitive film 42i are collectively referred to as a potassium ion-sensitive electrode 42. The sodium ion-sensitive electrode 41 and the potassium ion-sensitive electrode 42 come into contact with an electrolyte to be measured (in this example, urine), and generate, respectively, a first potential corresponding to a concentration of sodium ions (referred to as $E_1$) and a second potential corresponding to a concentration of potassium ions (referred to as $E_2$). The effective regions (functional regions) of the sodium ion-sensitive electrode 41 and the potassium ion-sensitive electrode 42 are defined, respectively, by sizes of the openings 51w and 52w (in this example, about 4 mm in diameter).

The substrate 31 is formed of an insulating material such as polyethylene terephthalate (PET), glass, silicon, a polyimide film, glass epoxy, polycarbonate or acrylic. Therefore, the surface 31a and the back surface 31b also have insulation quality. In this example, the size of the substrate 31 is set to about 50 mm as a dimension in the X direction (longitudinal direction), about 10 to 15 mm as a dimension in the Y direction (width direction) and about 200 µm as a dimension in the Z direction (thickness direction).

The first extraction electrode 43 and the second extraction electrode 44 are both formed of a conductive material such as Pt, Ag, Au, Ir, C or $IrO_2$. The first extraction electrode 43 and the second extraction electrode 44 both have a thickness of about 10 µm.

The insulating films 51 and 52 are both formed of a photocurable or thermosetting insulating resist, or a seal, a sheet, a tape or the like having insulation quality. The insulating films 51 and 52 both have a thickness of about 30 µm to 100 µm.

In this example, a solution obtained by dissolving Bis(12-corwn-4), polyvinyl chloride (PVC), 2-nitrophenyloctyl ether (NPOE) and potassium tetrakis (4-chlorophenyl)borate (K-TCPB) in tetrahydrofuran (THF) is used as a material solution for forming the sodium ion-sensitive film 41i. In this example, a solution obtained by dissolving Bis(benzo-15-crown-5), PVC, NPOE and K-TCPB in THF is used as a material solution for forming the potassium ion-sensitive film 42i. These material solutions are dried and cured in a manufacturing process described later.

As can be seen from the above description, the test strip 30 has the sodium ion-sensitive film 41i provided on the surface 31a of the substrate 31 and the potassium ion-sensitive film 42i provided on the back surface 31b opposite to the surface 31a of the substrate 31. That is, the sodium ion-sensitive film 41i and the potassium ion-sensitive film 42i are not arranged side by side on one main surface (the surface 31a or the back surface 31b) of the substrate 31, but arranged on main surfaces opposite to each other.

(Method for Producing Electrolyte Analysis Test Strip)

FIG. 2 shows a flow of a manufacturing process for producing the test strip 30. FIGS. 3A1, 3B1, 4A1, 4B1, 5A1, 5B1 and 6A1 show configurations of in-process articles (or produced test strip 30) in steps included in the manufacturing process when the substrate 31 is viewed obliquely. FIGS. 3A2, 3B2, 4A2, 4B2, 5A2, 5B2 and 6A2 show cross-sections of part of the articles in FIGS. 3A1, 3B1, 4A1, 4B1, 5A1, 5B1 and 6A1, respectively (specifically, for example, a cross-section of a part corresponding to the tip portion of the test strip 30 to be produced, where the part is viewed as indicated by arrows A2 and A2 in FIG. 3A1).

First, as shown in step S1 of FIG. 2, the first extraction electrode 43 is formed on the surface 31a of the substrate 31 by a screen printing method. Specifically, on the surface 31a of the substrate 31 extending along the X-Y plane, the first extraction electrodes 43, 43, . . . are patterned in a matrix form in the X direction and the Y direction as shown in FIG. 3A1. Each first extraction electrode 43 has the circular base portion 43a, the lead portion 43b and the electrode pad portion 43c, and is formed as a pattern elongated in the X direction. As shown in FIG. 3A2, the first extraction electrode 43 (in particular, base portion 43a) is formed in a flat film shape.

Next, as shown in step S2 of FIG. 2, the insulating film 51 is formed on the surface 31a of the substrate 31 by a screen printing method. Specifically, as shown in FIG. 3B1, the insulating film 51 is formed as a stripe-shaped pattern that extends across a plurality of first extraction electrodes 43, 43, . . . in the Y direction and is partitioned for each of rows of first extraction electrodes 43 (rows arranged in the Y direction) in the X direction so as to expose the electrode pad portions 43c, 43c, . . . . As shown in FIG. 3B2, the insulating film 51 has circular openings 51w corresponding respectively to the base portions 43a of the individual first extraction electrodes 43.

Next, as shown in step S3 of FIG. 2, the second extraction electrode 44 is formed on the back surface 31b of the substrate 31 by a screen printing method. Specifically, front and back sides of the substrate 31 are reversed, and on the back surface 31b of the substrate 31 extending along the X-Y plane, the second extraction electrodes 44, 44, . . . are patterned in a matrix form in the X direction and the Y direction as shown in FIG. 4A1. Each second extraction electrode 44 has the circular base portion 44a, the lead portion 44b and the electrode pad portion 44c, and is formed as a pattern elongated in the X direction. The pattern of the second extraction electrode 44 is formed in a position to correspond and coincide with the pattern of the first extraction electrode 43 with respect to the front and back sides of the substrate 31. As shown in FIG. 4A2, the second extraction electrode 44 (in particular, base portion 44a) is formed in a flat film shape. In FIG. 4A2 and the subsequent sectional views, the front and back sides of the substrate 31 are not reversed, and are drawn without being changed for easy understanding.

Next, as shown in step S4 of FIG. 2, the insulating film 52 is formed on the back surface 31b of the substrate 31 by a screen printing method. Specifically, as shown in FIG. 4B1, the insulating film 52 is formed as a stripe-shaped pattern that extends across a plurality of second extraction electrodes 44, 44, . . . in the Y direction and is partitioned for each of rows of second extraction electrodes 44 (rows arranged in the Y direction) in the X direction so as to expose the electrode pad portions 44c, 44c, . . . . The pattern of the insulating film 52 is also formed in a position to correspond and coincide with the pattern of the insulating film 51 with respect to the front and back sides of the substrate 31. As shown in FIG. 4B2, the insulating film 52 has circular openings 52w corresponding respectively to the base portions 44a of the individual second extraction electrodes 44.

The processing in steps S1 and S2 and the processing in steps S3 and S4 in FIG. 2 may be performed in a reversed order or in parallel. The base portion 43a and the lead portion 43b may be formed by printing in two stages using different materials. Similarly, the base portion 44a and the lead portion 44b may be formed by printing in two stages using different materials.

Next, as shown in step S5 of FIG. 2, the material solution for forming the sodium ion-sensitive film 41i as the first ion-sensitive film is applied to the surface 31a of the substrate 31 by an inkjet printing method. Specifically, on the surface 31a of the substrate 31, the material solution is applied to regions corresponding respectively to the circular openings 51w, 51w, . . . of the insulating film 51 (see FIG. 3B1) so as to come into contact with the base portion 43a as shown in FIG. 5A1. Then, the applied material solutions are dried and cured to form sodium ion-sensitive films 41i, 41i, . . . in the regions corresponding respectively to the openings 51w, 51w, . . . . As shown in FIG. 5A2, the formed sodium ion-sensitive film 41i has a dome-shaped cross-section due to surface tension. The base portion 43a and the sodium ion-sensitive film 41i constitute the sodium ion-sensitive electrode 41.

Next, as shown in step S6 of FIG. 2, the material solution for forming the potassium ion-sensitive film 42i as the second ion-sensitive film is applied to the back surface 31b of the substrate 31 by an inkjet printing method. Specifically, the front and back sides of the substrate 31 are reversed, and on the back surface 31b of the substrate 31, the material solution is applied to regions corresponding respectively to the circular openings 52w, 52w, . . . of the insulating film 52 (see FIG. 4B1) so as to come into contact with the base portion 44a as shown in FIG. 5B1. Then, the applied material solutions are dried and cured to form potassium ion-sensitive films 42i, 42i, . . . in the regions corresponding respectively to the openings 52w, 52w, . . . . As shown in FIG. 5B2, the formed potassium ion-sensitive film 42i has a dome-shaped cross-section due to surface tension. The base portion 44a and the potassium ion-sensitive film 42i constitute the potassium ion-sensitive electrode 42.

The processing in step S5 and the processing in step S6 in FIG. 2 may be performed in a reversed order or in parallel.

Next, as shown in step S7 of FIG. 2, the sensitivity of the sodium ion-sensitive film 41i as the first ion-sensitive film formed on the surface 31a of the substrate 31 (referred to as $S_1$) and the sensitivity of the potassium ion-sensitive film 42i as the second ion-sensitive film formed on the back surface 31b of the substrate 31 (referred to as $S_2$) are each inspected. Here, it has been empirically known that when the lots of the applied material solutions are the same, the sensitivity $S_1$ of the sodium ion-sensitive film 41i and the sensitivity $S_2$ of the potassium ion-sensitive film 42i are each constant in the X-Y plane of the substrate 31. Therefore, in step S7, it is sufficient to evaluate the sensitivity $S_1$ of a representative sodium ion-sensitive film 41i and the sensitivity $S_2$ of a representative potassium ion-sensitive film 42i in the X-Y plane of the substrate 31.

Subsequently, as shown in step S8 of FIG. 2, it is determined whether the sensitivity $S_1$ of the sodium ion-sensitive film 41i and the sensitivity $S_2$ of the potassium ion-sensitive film 42i are equivalent to each other, i.e., whether a sensitivity difference $|S_1-S_2|$ between both the ion-sensitive films is within a predetermined criterial range.

Here, if the sensitivity difference $|S_1-S_2|$ is outside the criterial range (NO in step S8), the in-process article is disposed of (e.g. discarded) as an inadequate article (step S9). Determination criterion for the sensitivity difference in step S8 will be described later.

Here, the selectivity of the sodium ion-sensitive film 41i formed on the surface 31a of the substrate 31 (referred to as $k_1$) and the selectivity of the potassium ion-sensitive film 42i formed on the back surface 31b of the substrate 31 (referred to as $k_2$) also need to be equivalent to each other. This condition is satisfied by configuring the material solution for forming the sodium ion-sensitive film 41i and the material solution for forming the potassium ion-sensitive film 42i as described above. Therefore, in this manufacturing process, the step of inspection for selectivity is omitted.

On the other hand, when the sensitivity difference $|S_1-S_2|$ is within the criterial range in step S8 (YES in step S8), the substrate 31 is cut (or punched) as shown in step S10. In this way, individual test strips 30 are obtained as shown in FIGS. 6A1 and 6A2.

As shown in FIGS. 6B1 and 6B2, through-holes 30w and 30w may be formed in the substrate 31 during punching in step S10 of FIG. 2. Specifically, the through-holes 30w and 30w are formed so as to extend from the surface 31a to the back surface 31b in regions other than regions occupied by the ion-sensitive electrodes 41 and 42 and the first and second extraction electrodes 43 and 44 (in particular, lead portions 43b and 44b) on the one end 31e side (tip portion 30e) in the X direction. In this example, the through-holes 30w and 30w are formed on both sides of the lead portions 43b and 44b in the Y direction. This is referred to as a test strip 30A.

The processing in step S8 and the processing in step S10 in FIG. 2 may be performed in a reversed order or in parallel.

By adding step S11 of FIG. 2, a permeable member 59 formed of a material permeable to the electrolyte (in this example, urine) to be measured may be attached to the periphery of tip portion 30e of the test strip 30 (in particular, sodium ion-sensitive electrode 41 and potassium ion-sensitive electrode 42) as shown in FIGS. 7A1 and 7A2. This is referred to as a test strip 30B. The attached permeable member 59 spatially continuously covers the sodium ion-sensitive film 41i and the potassium ion-sensitive film 42i with lying across the end surface of the substrate 31 from the surface 31a to the back surface 31b. As the permeable member 59, for example, wound fiber (thread), sponge, tissue paper, gauze or absorbent cotton is used.

When the test strip 30 (or 30A or 30B) is produced as described above, the application and curing of the material solution for forming the sodium ion-sensitive film 41i on the surface 31a and the application and curing of the material solution for forming the potassium ion-sensitive film 42i on the back surface 31b in steps S5 and S6 of FIG. 2 are not performed on a side-by-side basis, but performed on different main surfaces. Therefore, the test strip 30 can be produced while the material solutions for forming the sodium ion-sensitive film 41i and the potassium ion-sensitive film 42i do not come into contact with each other. As a result, in the test strip 30, the characteristics of the sodium ion-sensitive film 41i and the potassium ion-sensitive film 42i are not impaired. In the test strip 30, furthermore, the positions of the sodium ion-sensitive film 41i and the first extraction electrode 43 on the surface 31a coincide with the positions of the potassium ion-sensitive film 42i and the second extraction electrode 44 on the back surface 31b, respectively, with respect to the front and back sides of the substrate 31. Therefore, the size of the test strip 30 can be reduced to about half as compared to a configuration (conventional example) in which two ion-sensitive films are arranged side by side in the Y direction (width direction) on one main surface.

(Determination Criterion for Sensitivity Difference)

Determination criterion (allowable criterial range) for the sensitivity difference in step S8 of FIG. 2 will be described, herein. Accuracy of measurement of concentration ratio Ms between sodium ions and potassium ions by an electrochemical sensor 90 should fall within, for example, a range of ±10% over a possible concentration range of sodium ions and potassium ions contained in the liquid to be measured (in this example, urine). For satisfying this requirement, a criterion is set for controlling the difference (sensitivity difference) $|S_1-S_2|$ between the sensitivity $S_1$ of the sodium ion-sensitive electrode 41 and the sensitivity $S_2$ of the potassium ion-sensitive electrode 42.

In general, it is known that in urine, the sodium ion concentration $C_1$ is within the range of 50 to 500 mmol/L and the potassium ion concentration $C_1$ is within the range of 10 to 100 mmol/L. It is assumed that the sensitivity $S_1$ of the sodium ion-sensitive electrode 41 and the sensitivity $S_2$ of the potassium ion-sensitive electrode 42 are generally 55 mV/dec.

Here, it is assumed that, for urine in which the sodium ion concentration is $C_1=100$ mmol/L and the potassium ion concentration is $C_2=10$ mmol/L (referred to as "low-concentration urine"), the concentration ratio between sodium ions and potassium ions can be accurately measured as $Ms=(C_1/C_2)=10$. On the basis of this assumption, a case is envisaged where measurement can be performed with measurement accuracy of ±10% for urine in which the sodium ion concentration is $C_1=500$ mmol/L and the potassium ion concentration is $C_2=50$ mmol/L (referred to as "high-concentration urine").

i) First, the measurement accuracy is defined by sensitivity and potential reproducibility (a difference in potential output when one liquid specimen is repeatedly measured). When the sensitivity $S_1$ of the sodium ion-sensitive electrode 41 and the sensitivity $S_2$ of the potassium ion-sensitive electrode 42 are about 55 mV/dec, the reproduced potential satisfying a measurement accuracy of ±10% is ±2.3 mV.

ii) Next, a potential difference (a potential difference ΔE between the sodium ion-sensitive electrode 41 and the potassium ion-sensitive electrode 42) obtained by measurement for the low-concentration urine is defined as $E_L$, and a potential difference obtained by measurement for the high concentration urine is defined as $E_H$. These potential differences $E_L$ and $E_H$ are as shown in FIG. 8 where a calibration line Cref1 for the sodium ion-sensitive electrode 41 and a calibration line Cref2 for the potassium ion-sensitive electrode 42 are used. Here, when the sensitivity of the sodium ion-sensitive electrode 41 is fixed at $S_1=55$ mV/dec and the sensitivity $S_2$ of the potassium ion-sensitive electrode 42 is variably defined as SK [mV/dec], the potential differences $E_L$ and $E_H$ are expressed, respectively, as:

$$E_L=55 \log_{10}(100)-S_K \log 10(10)$$

$$E_H=55 \log_{10}(500)-S_K \log 10(50).$$

Therefore, the difference between both the potentials $|E_H-E_L|$ is as follows:

$$|E_H - E_L| = 55\log_{10}(5) - S_K\log_{10}(5)$$

$$= \log_{10}(5) \cdot (55 - S_K)(\text{unit: mV})$$

iii) When the difference $|E_H-E_L|$ is smaller than (the magnitude of) the reproduced potential 2.3 mV shown in the above i), the measurement accuracy falls within a range of ±10% in the low-concentration urine through to the high-concentration urine, that is, over the possible concentration range of sodium ions and potassium ions contained in the urine. Specifically, it is set that $|E_H-E_L|<2.3$. Since this condition is $$|\log_{10}(5)\cdot(55-S_K)|<2.3,$$

then, it is expressed as:

$$|55-S_K|<3.3$$

Therefore, in this example, the determination criterion (allowable criterial range) of the sensitivity difference $|S_1-S_2|$ is set to 3.3 mV.

(Configuration of Electrochemical Sensor)

FIG. 9A shows a block configuration of the electrochemical sensor 90 as an electrolyte analysis device according to an embodiment of the present invention.

The electrochemical sensor 90 generally includes the above-described test strip 30 and a main body 10 having a housing 10'. The main body 10 includes a connector 21 to which the test strip 30 is detachably attached. The connector 21 is provided in a manner of penetrating a wall surface of the housing 10'. A control unit 11, a data input unit 12, an operation unit 13, a sensor head connection detection unit 14 and a display unit 20 are mounted and housed in the main body 10.

In this example, the main body 10 has an elongated prismatic outer shape to be gripped by a user's hand (see, for example, FIG. 10B). As a result, the electrochemical sensor 90 is configured as a handheld device where the user holds the body 10 in his/her hand.

As shown in FIG. 9B, the connector 21 in FIG. 9A has a slot 22 into which the other end 31f of the test strip 30 is inserted. In the slot 22, a first contact electrode 23 and a second contact electrode 24 each including a bent plate spring are provided at positions corresponding to the electrode pad portions 43c and 44c of the test strip 30. When the user inserts the other end 31f of the test strip 30 into the slot 22 in a direction indicated by arrow X1, the electrode pad portions 43c and 44c come into contact and conduct with the first contact electrode 23 and the second contact electrode 24, respectively. As a result, the first potential $E_1$ generated by the sodium ion-sensitive electrode 41 of the test strip 30 and the second potential $E_2$ generated by the potassium ion-sensitive electrode 42 are transmitted to the first contact electrode 23 and the second contact electrode 24, respectively, and input to the main body 10.

The data input unit 12 mounted in the main body 10 inputs a potential difference ΔE between the sodium ion-sensitive electrode 41 and the potassium ion-sensitive electrode 42 of the test strip 30. The sensor head connection detection unit 14 detects whether or not the test strip 30 is attached to the main body 10 on the basis of whether or not a space between the contact electrodes 23 and 24 of the connector 21 is open. In this example, the operation unit 13 includes a push button switch, and acts for inputting an instruction to start user's measurement of a liquid to be measured. In this example, the display unit 20 includes a liquid crystal display (LCD), and displays various kinds of information such as results of calculation by the control unit 11. The control unit 11 includes a central processing unit (CPU) operated by software, and controls the overall operation of the electrochemical sensor 90. In particular, the control unit 11 acts as a calculation unit to calculate a concentration ratio between the concentrations of sodium ions and potassium ions contained in the electrolyte (in this example, urine) to be measured, by using the potential difference $\Delta E$ between the first potential $E_1$ and the second potential $E_2$ input to the main body 10. The control unit 11 includes a memory 18 that temporally stores the potential difference $\Delta E$ between the sodium ion-sensitive electrode 41 and the potassium ion-sensitive electrode 42.

In the electrochemical sensor 90, the concentration ratio $(C_1/C_2)$ between sodium ions and potassium ions contained in a liquid to be measured is determined on the basis of following principle. As described above, the sensitivity $S_1$ and the selectivity $k_1$ of the sodium ion-sensitive electrode 41 are equivalent to the sensitivity $S_2$ and the selectivity $k_2$ of the potassium ion-sensitive electrode 42, respectively. That is, $S_1-S_2 \cong 0$, and $k_1-k_2 \cong 0$. In this case, as disclosed in Patent Literature 2 (Japanese Patent No. 6127460), the potential difference $\Delta E$ between the sodium ion-sensitive electrode 41 and the potassium ion-sensitive electrode 42 is expressed by the following simplified expression (Eq. 1).

$$\Delta E = E_1{}^0 - E_2{}^0 + S_1 \log(C_1/C_2) \qquad \text{(Eq. 1)}$$

Here, $E_1{}^0 - E_2{}^0$ is a constant. When $\Delta E$ is measured for an electrolyte having a known concentration ratio between sodium ions and potassium ions (standard solution), and $E_1{}^0 - E_2{}^0$ as a constant and the sensitivity $S_1$ are determined in advance, respectively, the concentration ratio Ms $(=C_1/C_2)$ between sodium ions and potassium ions in the electrolyte to be measured can be calculated based on the expression (Eq. 1) by measuring the potential difference $\Delta E$ for the electrolyte to be measured.

(Measurement by User)

For example, as shown in FIG. 10A, the user puts urine 99 into a container 98, holds the main body 10 in his/her hand, and immerses the tip portion 30e of the test strip 30 in the urine 99. Then, the urine 99 comes into contact with the sodium ion-sensitive electrode 41 and the potassium ion-sensitive electrode 42 provided on both surfaces of the substrate 31. In this way, the sodium ion-sensitive electrode 41 generates the first potential $E_1$ corresponding to the sodium ion concentration $C_1$, and the potassium ion-sensitive electrode 42 generates the second potential $E_2$ corresponding to the potassium ion concentration $C_2$. The first potential $E_1$ generated by the sodium ion-sensitive electrode 41 and the second potential $E_2$ generated by the potassium ion-sensitive electrode 42 are transmitted to the main body 10 through the first extraction electrode 43, the second extraction electrode 44, and the first contact electrode 23 and the second contact electrode 24 of the connector 21. Then, the concentration ratio Ms $(=C_1/C_2)$ between sodium ions and potassium ions in the urine 99 is calculated by the control unit 11 as described above. The calculated concentration ratio Ms between sodium ions and potassium ions in the urine 99 is displayed on the display unit 20 provided on an outer surface of the main body 10. In this way, the concentration ratio Ms between sodium ions and potassium ions can be measured by a user's simple operation.

The user may use the test strip 30A shown in FIGS. 6B1 and 6B2 (specifically, one having a configuration in which through-holes 30w and 30w are formed in the test strip 30). In this case, as shown in FIG. 10B, the user holds the main body 10 in his/her hand, directs the tip portion 30e of the test strip 30A obliquely downward, and sprinkles the urine 99 over the tip portion 30e. Then, the urine 99 comes into contact with the ion-sensitive electrode on the upper surface side (in this example, sodium ion-sensitive electrode 41), runs through the through-holes 30w and 30w to the lower surface side, and comes into contact with the ion-sensitive electrode on the lower surface side (in this example, potassium ion-sensitive electrode 42). Thereby, the concentration ratio Ms $(=C_1/C_2)$ between sodium ions and potassium ions contained in the urine 99 can be measured. In this way, the concentration ratio Ms between sodium ions and potassium ions contained in the urine 99 can be measured by a simple operation in which the user sprinkles the urine 99 over the tip portion 30e of the test strip 30A. In this case, the user does not need to specially provide a container 98 for the urine 99 to be measured.

In an example of the test strip 30A, the through-holes 30w are provided on both sides of the first and second extraction electrodes 43 and 44 (in particular, lead portions 43b and 44b) in the width direction (Y direction) of the substrate 31, but the present invention is not limited thereto. A through-hole may be provided at a center in the width direction (Y direction) of the substrate 31, with the first and second extraction electrodes 43 and 44 (in particular, lead portions 43b and 44b) bypassing the through-hole.

The user may use the test strip 30B shown in FIGS. 7A1 and 7A2 (specifically, one having a configuration in which the tip portion 30e is covered with the permeable member 59 in the test strip 30). In this case, as shown in FIG. 10C, the user holds the main body 10 in his/her hand, directs the tip portion 30e of the test strip 30B obliquely downward, and sprinkles the urine 99 over the permeable member 59. Then, the urine 99 permeates the permeable member 59 in the thickness direction to come into contact with the ion-sensitive electrode on the upper surface side (in this example, sodium ion-sensitive electrode 41), and also permeates across the end surface of the substrate 31 from the upper surface side to the lower surface side along the permeable member 59 to come into contact with the ion-sensitive electrode on the lower surface side (in this example, the potassium ion-sensitive electrode 42). Thereby, the concentration ratio $(C_1/C_2)$ between sodium ions and potassium ions contained in the urine 99 can be measured. In this way, the concentration ratio $(C_1/C_2)$ between sodium ions and potassium ions contained in the urine 99 can be measured by a simple operation in which the user sprinkles the urine 99 over the permeable member 59. In this case, the user does not need to specially provide a container 98 for the urine 99 to be measured.

In an example of the test strip 30B, the permeable member 59 covers only the tip portion 30e of the test strip 30B, but the present invention is not limited thereto. The permeable member 59 may cover substantially the entire area (regions other than electrode pad portions 43c and 44c) of the test strip 30B.

Of course, the user can also perform the measurement by a configuration in which the test strip 30A or 30B is immersed in the urine 99 contained in the container 98.

Second Embodiment

FIG. 11A shows a cross-section of an electrolyte analysis test strip 30C according to the second embodiment of the present invention, which is taken along a longitudinal direction (X direction). FIG. 11B shows the test strip 30C in an exploded state. Like the test strip 30 described above, the test strip 30C is used for measuring the concentration ratio between sodium ions as the first ion species and potassium ions as the second ion species which are contained in urine to be measured.

As can be seen from FIGS. 11A and 11B, the test strip 30C is different principally in that the test strip 30 includes two substrates (a first substrate 31A and a second substrate 31B) laminated and bonded to each other instead of one substrate 31 in the test strip 30 according to the first embodiment. The first substrate 31A and the second substrate 31B are collectively referred to as a substrate 31'. In FIGS. 11A and 11B and subsequent drawings, components identical to those in FIGS. 1A and 1B are given like symbols, and duplicate descriptions are appropriately omitted.

On a surface 31Aa of the first substrate 31A which is one main surface of the substrate 31', a first extraction electrode 43, an insulating film 51 having an opening 51w, and a sodium ion-sensitive film 41i as a first ion-sensitive film are provided. The first extraction electrode 43 has, on the surface 31Aa of the first substrate 31A, a pattern including a base portion 43a provided in a circular specific region on the one end 31e side in the X direction, a lead portion 43b elongatedly extending from the base portion 43a to the other end 31f side, and an electrode pad portion 43c which is provided on the other end 31f side in continuation to the lead portion 43b and has a width larger than that of the lead portion 43b. Through the opening 51w of the insulating film 51, a sodium ion-sensitive film 41i as a first ion-sensitive film is provided on the base portion 43a so as to be in electrical contact with the base portion 43a.

On a surface 31Ba of the second substrate 31B which is the other main surface of the substrate 31', a second extraction electrode 44, an insulating film 52 having an opening 52w, and a potassium ion-sensitive film 42i as a second ion-sensitive film are provided. The second extraction electrode 44 has, on the surface 31Ba of the second substrate 31B, a pattern including a base portion 44a provided in a circular specific region on the one end 31e side in the X direction, a lead portion 44b elongatedly extending from the base portion 44a to the other end 31f side, and an electrode pad portion 44c which is provided on the other end 31f side in continuation to the lead portion 44b and has a width larger than that of the lead portion 44b. The pattern of the first extraction electrode 43 and the pattern of the second extraction electrode 44 are set to coincide to each other in the X-Y plane where the substrate 31' extends. Through the opening 52w of the insulating film 52, a potassium ion-sensitive film 42i as a second ion-sensitive film is provided on the base portion 44a so as to be in electrical contact with the base portion 44a.

Hereinafter, as in the first embodiment, the base portion 43a and the sodium ion-sensitive film 41i are collectively referred to as a sodium ion-sensitive electrode 41. The base portion 44a and the potassium ion-sensitive film 42i are collectively referred to as a potassium ion-sensitive electrode 42. The sodium ion-sensitive electrode 41 and the potassium ion-sensitive electrode 42 come into contact with an electrolyte to be measured (in this example, urine), and generate, respectively, a first potential $E_1$ corresponding to a concentration of sodium ions and a second potential $E_2$ corresponding to a concentration of potassium ions. The effective regions (functional regions) of the sodium ion-sensitive electrode 41 and the potassium ion-sensitive electrode 42 are defined, respectively, by sizes of the openings 51w and 52w (in this example, about 4 mm in diameter).

The first substrate 31A and the second substrate 31B that form the substrate 31' are both formed of an insulating material such as polyethylene terephthalate (PET), glass, silicon, a polyimide film, glass epoxy, polycarbonate or acrylic. Therefore, the surface 31Aa of the first substrate 31A and the surface 31Ba of the second substrate 31B also have insulation quality. The size of the first substrate 31A and the size of the second substrate 31B are set to coincide to each other. In this example, the size of the first substrate 31A and the size of the second substrate 31B are set to about 50 mm as a dimension in the X direction (longitudinal direction), about 10 to 15 mm as a dimension in the Y direction (width direction) and about 200 μm as a dimension in the Z direction (thickness direction).

The first extraction electrode 43, the second extraction electrode 44 and the insulating films 51 and 52 are all formed of the same materials as in the first embodiment, and set to the same dimensions as in the foregoing example.

As in the first embodiment, a solution obtained by dissolving Bis(12-crown-4), polyvinyl chloride (PVC), 2-nitrophenyloctyl ether (NPOE) and potassium tetrakis (4-chlorophenyl)borate (K-TCPB) in tetrahydrofuran (THF) is used as a material solution for forming the sodium ion-sensitive film 41i. As in the first embodiment, a solution obtained by dissolving Bis(benzo-15-crown-5), PVC, NPOE and K-TCPB in THF is used as a material solution for forming the potassium ion-sensitive film 42i. These material solutions are dried and cured in a manufacturing process described later.

As can be seen from the above description, the test strip 30C has the sodium ion-sensitive film 41i provided on the surface 31Aa of the first substrate 31A and the potassium ion-sensitive film 42i provided on the surface 31Ba of the second substrate 31B which is opposite to the surface 31Aa of the first substrate 31A. That is, the sodium ion-sensitive film 41i and the potassium ion-sensitive film 42i are not arranged side by side on one main surface (the surface 31Aa of the first substrate 31A or the surface 31Ba of the second substrate 31B) of the substrate 31, but arranged on main surfaces opposite to each other.

(Method for Producing Electrolyte Analysis Test Strip)

FIG. 12 shows a flow of a manufacturing process for producing the test strip 30C. FIGS. 13A1, 13B1, 14A1, 14B1, 15A1, 15B1, 16A1 and 17A1 show the configurations of in-process articles (or produced test strip 30C) in steps included in the manufacturing process when the first substrate 31A or the second substrate 31B are viewed obliquely. FIGS. 13A2, 13B2, 14A2, 14B2, 15A2, 15B2, 16A2 and 17A2 show cross-sections of part of the articles in FIGS. 13A1, 13B1, 14A1, 14B1, 15A1, 15B1, 16A1 and 17A1, respectively (specifically, for example, a cross-section of a part corresponding to the tip portion of the test strip 30C to be produced, where the part is viewed as indicated by arrows A2 and A2 in FIG. 13A1).

First, as shown in step S101 of FIG. 12, the first extraction electrode 43 is formed on the surface 31Aa of the first substrate 31A by a screen printing method. Specifically, on the surface 31Aa of the first substrate 31A extending along the X-Y plane, the first extraction electrodes 43, 43, . . . are patterned in a matrix form in the X direction and the Y direction as shown in FIG. 13A1. Each first extraction electrode 43 has the circular base portion 43a, the lead portion 43b and the electrode pad portion 43c, and is formed as a pattern elongated in the X direction. As shown in FIG. 13A2, the first extraction electrode 43 (in particular, base portion 43a) is formed in a flat film shape.

Next, as shown in step S102 of FIG. 12, the insulating film 51 is formed on the surface 31Aa of the first substrate 31A by a screen printing method. Specifically, as shown in FIG.

13B1, the insulating film 51 is formed as a stripe-shaped pattern that extends across a plurality of first extraction electrodes 43, 43, . . . in the Y direction and is partitioned for each of rows of first extraction electrodes 43 (rows arranged in the Y direction) in the X direction so as to expose the electrode pad portions 43c, 43c, . . . . As shown in FIG. 13B2, the insulating film 51 has circular openings 51w corresponding respectively to the base portions 43a of the individual first extraction electrodes 43.

Next, as shown in step S103 of FIG. 12, the second extraction electrode 44 is formed on the surface 31Ba of the second substrate 31B by a screen printing method. Specifically, on the surface 31Ba of the second substrate 31B extending along the X-Y plane, the second extraction electrodes 44, 44, . . . are patterned in a matrix form in the X direction and the Y direction as shown in FIG. 14A1. Each second extraction electrode 44 has the circular base portion 44a, the lead portion 44b and the electrode pad portion 44c, and is formed as a pattern elongated in the X direction. The pattern of the second extraction electrode 44 on the surface 31Ba of the second substrate 31B is formed in a position to correspond and coincide with the pattern of the first extraction electrode 43 on the surface 31Aa of the first substrate 31A. As shown in FIG. 14A2, the second extraction electrode 44 (in particular, base portion 44a) is formed in a flat film shape.

Next, as shown in step S104 of FIG. 12, the insulating film 52 is formed on the surface 31Ba of the second substrate 31B by a screen printing method. Specifically, as shown in FIG. 14B1, the insulating film 52 is formed as a stripe-shaped pattern that extends across a plurality of second extraction electrodes 44, 44, . . . in the Y direction and is partitioned for each of rows of second extraction electrodes 44 (rows arranged in the Y direction) in the X direction so as to expose the electrode pad portions 44c, 44c, . . . . The pattern of the insulating film 52 on the surface 31Ba of the second substrate 31B is also formed in a position to correspond and coincide with the pattern of the insulating film 51 on the surface 31Aa of the first substrate 31A. As shown in FIG. 14B2, the insulating film 52 has circular openings 52w corresponding respectively to the base portions 44a of the individual second extraction electrodes 44.

The processing in steps S101 and S102 and the processing in steps S103 and S104 in FIG. 12 may be performed in a reversed order or in parallel.

Next, as shown in step S105 of FIG. 12, the material solution for forming the sodium ion-sensitive film 41i as the first ion-sensitive film is applied to the surface 31Aa of the first substrate 31A by an inkjet printing method. Specifically, on the surface 31Aa of the first substrate 31A, the material solution is applied to regions corresponding respectively to the circular openings 51w, 51w, . . . of the insulating film 51 (see FIG. 13B1) so as to come into contact with the base portion 43a as shown in FIG. 15A1. Then, the applied material solutions are dried and cured to form sodium ion-sensitive films 41i, 41i, . . . in the regions corresponding respectively to the openings 51w, 51w, . . . . As shown in FIG. 15A2, the formed sodium ion-sensitive film 41i has a dome-shaped cross-section due to surface tension. The base portion 43a and the sodium ion-sensitive film 41i constitute the sodium ion-sensitive electrode 41.

Next, as shown in step S106 of FIG. 12, the material solution for forming the potassium ion-sensitive film 42i as the second ion-sensitive film is applied to the surface 31Ba of the second substrate 31B by an inkjet printing method. Specifically, on the surface 31Ba of the second substrate 31B, the material solution is applied to regions corresponding respectively to the circular openings 52w, 52w, . . . of the insulating film 52 (see FIG. 14B1) so as to come into contact with the base portion 44a as shown in FIG. 15B1. Then, the applied material solutions are dried and cured to form potassium ion-sensitive films 42i, 42i, . . . in the regions corresponding respectively to the openings 52w, 52w, . . . . As shown in FIG. 15B2, the formed potassium ion-sensitive film 42i has a dome-shaped cross-section due to surface tension. The base portion 44a and the potassium ion-sensitive film 42i constitute the potassium ion-sensitive electrode 42.

The processing in step S105 and the processing in step S106 in FIG. 12 may be performed in a reversed order or in parallel.

Next, as shown in step S107 of FIG. 12, the sensitivity $S_1$ of the sodium ion-sensitive film 41i as the first ion-sensitive film is inspected on the first substrate 31A. In parallel with this, as shown in step S108, the sensitivity $S_2$ of the potassium ion-sensitive film 42i as the second ion-sensitive film is inspected on the second substrate 31B. Here, it has been empirically known that when the lots of the applied material solutions are the same, the sensitivity $S_1$ of the sodium ion-sensitive film 41i and the sensitivity $S_2$ of the potassium ion-sensitive film 42i are each constant in the X-Y plane of the first substrate 31A and the X-Y plane of the second substrate 31B. Therefore, in steps S107 and S108, it is sufficient to evaluate the sensitivity $S_1$ of a representative sodium ion-sensitive film 41i and the sensitivity $S_2$ of a representative potassium ion-sensitive film 42i in the X-Y plane of the first substrate 31A and the X-Y plane of the second substrate 31B, respectively.

Subsequently, as shown in step S109 of FIG. 12, a combination of the first substrate 31A and the second substrate 31B is selected. Specifically, for example, a plurality of in-process articles obtained by performing the processing of up to step S107 on the first substrate 31A and a plurality of in-process articles obtained by performing the processing of up to step S108 on the second substrate 31B are provided. Among those in-process articles, a combination of in-process article (the first substrate 31A and the second substrate 31B) is selected in which the sensitivity $S_1$ of the sodium ion-sensitive film 41i and the sensitivity $S_2$ of the potassium ion-sensitive film 42i are equivalent to each other. Here, the phrase "the sensitivity $S_1$ of the sodium ion-sensitive film 41i and the sensitivity $S_2$ of the potassium ion-sensitive film 42i are equivalent to each other" means that the sensitivity difference $|S_1 - S_2|$ is within a predetermined criterial range as in the first embodiment. By selecting this combination, disposal of (e.g. discarding) in-process articles as inadequate articles can be avoided.

Here, as in the first embodiment, a combination of in-process articles (the first substrate 31A and the second substrate 31B) selected is also required to ensure that the selectivity $k_1$ of the sodium ion-sensitive film 41i formed on the surface 31Aa of the first substrate 31A and the selectivity $k_2$ of the potassium ion-sensitive film 42i formed on the surface 31Ba of the second substrate 31B are equivalent to each other. This condition is satisfied by configuring the material solution for forming the sodium ion-sensitive film 41i and the material solution for forming the potassium ion-sensitive film 42i as described above. Therefore, in this manufacturing process, the step of inspection for selectivity is omitted as an element for selection.

Next, as shown in step S110 of FIG. 12, the first substrate 31A of the selected in-process article and the second substrate 31B of the selected in-process article are joined back to back. Specifically, as shown in FIGS. 16A1 and 16A2, the back surface 31Ab of the first substrate 31A and the back surface 31Bb of the second substrate 31B, both on which nothing is formed, are faced to each other with the surface 31Aa of the first substrate 31A facing upward (+Z direction) and the surface 31Ba of the second substrate 31B facing downward (−Z direction). As indicated by an arrow Z1 in FIG. 16A1, the back surface 31Ab of the first substrate 31A and the back surface 31Bb of the second substrate 31B are laminated and bonded to each other with, for example, an adhesive (not shown). Of course, the back surface 31Ab of the first substrate 31A and the back surface 31Bb of the second substrate 31B may be faced and bonded to each other with the surface 31Aa of the first substrate 31A facing downward (−Z direction) and the surface 31Ba of the second substrate 31B facing upward (+Z direction). The first substrate 31A and the second substrate 31B may be bonded to each other by using, for example, a double-sided adhesive tape.

Next, as shown in step S111 of FIG. 12, the substrate 31' is cut (or punched) In this way, individual test strips 30C are obtained as shown in FIGS. 17A1 and 17A2.

As shown in FIGS. 6B1 and 6B2 for the first embodiment, the through-holes 30w and 30w may be formed in the substrate 31' during punching in step S111 of FIG. 12.

By adding step S112 of FIG. 12, a permeable member 59 formed of a material permeable to the electrolyte (in this example, urine) to be measured may be attached to the periphery of tip portion 30e of the test strip 30C (in particular, sodium ion-sensitive electrode 41 and potassium ion-sensitive electrode 42) as shown in FIGS. 17B1 and 7B2. This is referred to as a test strip 30D. The attached permeable member 59 spatially continuously covers the sodium ion-sensitive film 41i and the potassium ion-sensitive film 42i with lying across the end surface of the substrate 31 from the surface 31Aa of the first substrate 31A to the surface 31Ba of the second substrate 31B. As the permeable member 59, for example, wound fiber (thread), sponge, tissue paper, gauze or absorbent cotton is used as in the first embodiment.

When the test strip 30C (or 30D) is produced as described above, the application and curing of the material solution for forming the sodium ion-sensitive film 41i on the surface 31Aa of the first substrate 31A and the application and curing of the material solution for forming the potassium ion-sensitive film 42i on the surface 31Ba of the second substrate 31B in steps S105 to S106 of FIG. 12 are not performed on a side-by-side basis, but performed completely separately in terms of space. Therefore, the test strip 30C can be produced while the material solutions for forming the sodium ion-sensitive film 41i and the potassium ion-sensitive film 42i do not come into contact with each other. As a result, in the test strip 30C, the characteristics of the sodium ion-sensitive film 41i and the potassium ion-sensitive film 42i are not impaired. In the test strip 30C, furthermore, the positions of the sodium ion-sensitive film 41i and the first extraction electrode 43 of the first substrate 31A coincide with the positions of the potassium ion-sensitive film 42i and the second extraction electrode 44 of the second substrate 31B, respectively, with respect to the front and back sides of the substrate 31'. Therefore, the size of the test strip 30C can be reduced to about half as compared to a configuration (conventional example) in which two ion-sensitive films are arranged side by side in the Y direction (width direction) on one main surface.

Even with the test strips 30C and 30D according to the second embodiment, the user can perform measurement by a manner in which the tip portion 30e of the test strip 30C or 30D is immersed in the urine 99 contained in the container 98 (see FIG. 10A) or a manner in which urine is sprinkled over the tip portion 30e of the test strip 30C or 30D (see FIG. 10 C) as shown in the first embodiment. That is, the measurement can be performed by a simple operation.

In the above embodiments, a case has been described where a concentration ratio between sodium ions and potassium ions as first and second ion species is measured, but the present invention is not limited thereto. The electrolyte analysis test strip of the present invention and an electrochemical sensor including the test strip can be applied a concentration ratio between various ions such as calcium ions, chloride ions, lithium ions, nitrate ions, nitrite ions, sulfate ions, sulfite ions, iodide ions, magnesium ions, bromide ions, perchlorate ions and hydrogen ions in addition to sodium ions and potassium ions. However, for calculation based only on the potential difference generated by the first and second ion-sensitive films without any reference electrode, the ionic valences of the first and second ion species are required to be equivalent to each other.

As described above, in a first aspect, an electrolyte analysis test strip of the present disclosure is an electrolyte analysis test strip for measuring a concentration ratio between a first ion species and a second ion species contained in an electrolyte, the electrolyte analysis test strip comprising:

a substrate extending in one direction;

a first ion-sensitive film that is provided in a specific region on one end side in the one direction on one main surface of the substrate and comes into contact with the electrolyte to generate a first potential corresponding to a concentration of the first ion species;

a first extraction electrode extending from the first ion-sensitive film to another end side opposite to the one end side on the one main surface;

a second ion-sensitive film that is provided in a specific region on the one end side on an other main surface opposite to the one main surface of the substrate, and comes into contact with the electrolyte to generate a second potential corresponding to a concentration of the second ion species; and a second extraction electrode extending from the second ion-sensitive film to the other end side on the other main surface, wherein the substrate includes a first substrate and a second substrate laminated and bonded to each other, the one main surface is one being farther from the second substrate out of two main surfaces of the first substrate, and the other main surface is one being farther from the first substrate out of two main surfaces of the second substrate.

In the present specification, the "one main surface" and the "other main surface" of a substrate refer to a pair of plate surfaces that spatially extend, and are different from end surfaces.

The "one end side" refers to a side closer to the one end out of the one end and the other end in the one direction. The "other end side" refers to a side closer to the other end out of the one end and the other end in the one direction.

In the electrolyte analysis test strip of the present disclosure, the first ion-sensitive film is provided on one main surface of the substrate, and the second ion-sensitive film is provided on the other main surface of the substrate which is opposite to the one main surface. That is, the first ion-sensitive film and the second ion-sensitive film are not arranged side by side on one main surface of the substrate, but arranged on main surfaces opposite to each other. More specifically, the first ion-sensitive film is provided on a main surface of the first substrate which is farther from the second substrate, and the second ion-sensitive film is provided on a main surface of the second substrate which is farther from the first substrate. For this arrangement, during manufacturing stage of the electrolyte analysis test strip, the application and curing of the material solution for forming the first ion-sensitive film on the one main surface and the application and curing of the material solution for forming the second ion-sensitive film on the other main surface are not performed on a side-by-side basis, but performed on different main surfaces. More specifically, before the first substrate and the second substrate are laminated and bonded to each other, the formation of the first ion-sensitive film on the one main surface of the first substrate and the formation of the second ion-sensitive film on the other main surface of the second substrate can be performed completely separately in terms of space. Therefore, the electrolyte analysis test strip can be produced while the material solutions for forming the first ion-sensitive film and the second ion-sensitive film do not come into contact with each other. As a result, in the electrolyte analysis test strip, the characteristics of the first ion-sensitive film and the second ion-sensitive film are not impaired. When the positions of the first ion-sensitive film and the first extraction electrode on the one main surface of the first substrate coincide with the positions of the second ion-sensitive film and the second extraction electrode on the other main surface of the second substrate, respectively, with respect to front and back sides, the size of the test strip can be reduced to substantially half as compared to a case where both the ion-sensitive films are arranged side by side in a width direction on one main surface.

The formation of the first ion-sensitive film on the one main surface of the first substrate and the formation of the second ion-sensitive film on the other main surface of the second substrate can be performed at different times, for example, the first ion-sensitive film is formed on the one main surface of the first substrate, followed by formation of the second ion-sensitive film on the other main surface of the second substrate.

During use stage of the electrolyte analysis test strip, for example, when the one end side (tip portion) of the substrate is immersed in an electrolyte, the electrolyte comes into contact with the first ion-sensitive film and the second ion-sensitive film. Thereby, the first ion-sensitive film generates a first potential corresponding to the concentration of the first ion species, and the second ion-sensitive film generates a second potential corresponding to the concentration of the second ion species. The first potential generated by the first ion-sensitive film and the second potential generated by the second ion-sensitive film are transmitted to the other end side of the substrate through the first extraction electrode and the second extraction electrode, respectively. A concentration ratio between the first ion species and the second ion species is calculated on the basis of a potential difference between the first potential and the second potential. In this way, the concentration ratio between the first ion species and the second ion species contained in the electrolyte can be measured.

In a second aspect, a test strip manufacturing method of the present disclosure is a test strip manufacturing method for producing the electrolyte analysis test strip of the first aspect, the method comprising:

providing the first substrate and the second substrate;
forming the first extraction electrode extending from the specific region on the one end side to the other end side opposite to the one end side in the one direction on a surface as the one main surface of the first substrate;
forming the second extraction electrode extending from the specific region on the one end side to the other end side on a surface as the other main surface of the second substrate;
then applying a material solution of the first ion-sensitive film onto a portion of the first extraction electrode, the portion formed in the specific region, on the surface as the one main surface of the first substrate, and drying and/or curing the applied material solution to form the first ion-sensitive film;
applying a material solution of the second ion-sensitive film onto a portion of the second extraction electrode, the portion being formed in the specific region, on the surface as the other main surface of the second substrate, and drying and/or curing the applied material solution to form the second ion-sensitive film; and
subsequently laminating and bonding a back surface opposite to the surface as the one main surface of the first substrate and a back surface opposite to the surface as the other main surface of the second substrate to each other.

In the test strip manufacturing method of the present disclosure, formation of the first ion-sensitive film and formation of the second ion-sensitive film are performed before the first substrate and the second substrate are laminated and bonded to each other. In this case, the formation of the first ion-sensitive film on the one main surface of the first substrate and the formation of the second ion-sensitive film on the other main surface of the second substrate can be performed completely separately in terms of space. Therefore, the first ion-sensitive film and the second ion-sensitive film can be produced while the material solutions for forming the ion-sensitive films do no come into contact with each other. As a result, in the electrolyte analysis test strip produced, the characteristics of the first ion-sensitive film and the second ion-sensitive film are not impaired. When the positions of the first ion-sensitive film and the first extraction electrode on the one main surface of the first substrate coincide with the positions of the second ion-sensitive film and the second extraction electrode on the other main surface of the second substrate, respectively, with respect to the front and back sides, the size of the test strip can be reduced to substantially half as compared to a case where both the ion-sensitive films are arranged side by side in a width direction on one main surface.

The formation of the first ion-sensitive film on the one main surface of the first substrate and the formation of the second ion-sensitive film on the other main surface of the second substrate can be performed temporally in parallel or at different times.

After the formation of the first ion-sensitive film and the formation of the second ion-sensitive film are performed, a back surface opposite to the surface as the one main surface of the first substrate (i.e., the other main surface on which the first ion-sensitive film is not formed) and a back surface opposite to the surface as the other main surface of the second substrate (i.e., the other main surface on which the second ion-sensitive film is not formed) are faced, laminated and bonded to each other.

In a third aspect, an electrolyte analysis test strip of the present disclosure is an electrolyte analysis test strip for measuring a concentration ratio between a first ion species and a second ion species contained in an electrolyte, the electrolyte analysis test strip comprising:

a substrate extending in one direction;

a first ion-sensitive film that is provided in a specific region on one end side in the one direction on one main surface of the substrate and comes into contact with the electrolyte to generate a first potential corresponding to a concentration of the first ion species;

a first extraction electrode extending from the first ion-sensitive film to another end side opposite to the one end side on the one main surface;

a second ion-sensitive film that is provided in a specific region on the one end side on an other main surface opposite to the one main surface of the substrate, and comes into contact with the electrolyte to generate a second potential corresponding to a concentration of the second ion species; and a second extraction electrode extending from the second ion-sensitive film to the other end side on the other main surface, wherein the substrate has, on the one end side in the one direction, a through-hole extending from the one main surface to the other main surface in a region other than a region occupied by the first and second ion-sensitive films and the first and second extraction electrodes.

In the electrolyte analysis test strip of the present disclosure, during use stage, the user directs the one end side (tip portion) of the test strip obliquely downward, and sprinkles the electrolyte over the tip portion, for example. Then, the electrolyte comes into contact with the ion-sensitive film (e.g. the first ion-sensitive film) on the upper surface side, runs through the through-hole to the lower surface side, and comes into contact with the ion-sensitive film (in this example, the second ion-sensitive film) on the lower surface side. Therefore, the concentration ratio between the first ion species and the second ion species contained in the electrolyte can be measured. In this way, the concentration ratio between the first ion species and the second ion species contained in the electrolyte can be measured by a simple operation in which the user sprinkles the electrolyte over the tip portion of the test strip. In this case, the user does not need to specially provide a container for the electrolyte to be measured.

In a fourth aspect, an electrolyte analysis test strip of the present disclosure is an electrolyte analysis test strip for measuring a concentration ratio between a first ion species and a second ion species contained in an electrolyte, the electrolyte analysis test strip comprising:

a substrate extending in one direction;

a first ion-sensitive film that is provided in a specific region on one end side in the one direction on one main surface of the substrate and comes into contact with the electrolyte to generate a first potential corresponding to a concentration of the first ion species;

a first extraction electrode extending from the first ion-sensitive film to another end side opposite to the one end side on the one main surface;

a second ion-sensitive film that is provided in a specific region on the one end side on an other main surface opposite to the one main surface of the substrate, and comes into contact with the electrolyte to generate a second potential corresponding to a concentration of the second ion species;

a second extraction electrode extending from the second ion-sensitive film to the other end side on the other main surface; and a permeable member formed of a material permeable to the electrolyte, wherein

24 the permeable member spatially continuously covers the first ion-sensitive film and the second ion-sensitive film with lying across an end surface of the substrate from the one main surface to the other main surface.

The "electrolyte-permeable material" refers to, for example, wound fiber (thread), sponge, tissue paper, gauze, or absorbent cotton.

In the electrolyte analysis test strip of the present disclosure, during use stage, the user directs the one end side (tip portion) of the test strip obliquely downward, and sprinkles the electrolyte over the tip portion where the permeable member is provided, for example. Then, the electrolyte permeates the permeable member in the thickness direction to come into contact with the ion-sensitive film (e.g. the first ion-sensitive film) on the upper surface side, and also permeates across the end surface of the substrate from the upper surface side to the lower surface side along the permeable member to come into contact with the ion-sensitive film (in this example, the second ion-sensitive film) on the lower surface side. Therefore, the concentration ratio between the first ion species and the second ion species contained in the electrolyte can be measured. In this way, the concentration ratio between the first ion species and the second ion species contained in the electrolyte can be measured by a simple operation in which the user sprinkles the electrolyte over the tip portion of the test strip (where the permeable member is provided). In this case, the user does not need to specially provide a container for the electrolyte to be measured.

In the electrolyte analysis test strip according to one embodiment, the electrolyte is urine, the first ion species is a sodium ion, and the second ion species is a potassium ion.

In the electrolyte analysis test strip according to this one embodiment, a concentration ratio between sodium ions and potassium ions in urine can be measured by a simple operation by the user (an operation in which the one end side (tip portion) of the test strip is immersed in urine or an operation in which urine is sprinkled over the one end side (tip portion) of the test strip).

In the electrolyte analysis test strip according to one embodiment, sensitivity of the first ion-sensitive film and sensitivity of the second ion-sensitive film are equivalent to each other, and selectivity of the first ion-sensitive film and selectivity of the second ion-sensitive film are equivalent to each other.

The "sensitivity" of the ion-sensitive film means the amount of change in potential generated by the sensitive film, with respect to a change in ion concentration of an object to be measured. For example, the sensitivity is expressed in the unit of mV/dec as the amount of change in potential when the ion concentration changes by one digit. The "selectivity" of the ion-sensitive film means the amount of influence of an interference substance on a potential generated by the sensitive film. For example, the sodium ion-sensitive substance Bis (12-crown-4), which is a crown ether-based sensitive substance, has a selectivity of about $1/100$ to potassium ions. The potassium ion-sensitive substance Bis (benzo-15-crown-5) has a selectivity of $1/1000$ or more to sodium ions.

For the concentration ratio between the first ion species and the second ion species in the electrolyte analysis test strip according to this one embodiment, the concentration ratio between the first ion species and the second ion species can be calculated only on the basis of the potential difference generated by the first and second ion-sensitive films, without any reference electrode.

In another aspect, an electrolyte analysis device of the present disclosure is an electrolyte analysis device for measuring a concentration ratio between a first ion species and a second ion species contained in an electrolyte, the electrolyte analysis device comprising:

the electrolyte analysis test strip described above; and a main body, the main body including a connector into which the other end side of the electrolyte analysis test strip is inserted, the connector including a first contact electrode and a second contact electrode that are in contact with the first extraction electrode and the second extraction electrode, respectively, and a calculation unit that calculates a concentration ratio between the first ion species and the second ion species contained in the electrolyte based on a potential difference between the first potential and the second potential obtained through the first contact electrode and the second contact electrode of the connector when the first and second ion-sensitive films of the electrolyte analysis test strip come into contact with the electrolyte.

In the electrolyte analysis device of the present disclosure, during use stage of the electrolyte analysis test strip, the other end side of the electrolyte analysis test strip is inserted into the connector. The first contact electrode and the second contact electrode of the connector are in contact with the first extraction electrode and the second extraction electrode, respectively. In this way, when the first and second ion-sensitive films of the electrolyte analysis test strip come into contact with the electrolyte, a first potential generated by the first ion-sensitive film and a second potential generated by the second ion-sensitive film are obtained at the first contact electrode and the second contact electrode, respectively. On the basis of a potential difference between the first potential and the second potential, the calculation unit calculates a concentration ratio between the first ion species and the second ion species contained in the electrolyte. In this way, the concentration ratio between the first ion species and the second ion species contained in the electrolyte can be measured.

As is apparent from the above, the electrolyte analysis test strip of the present disclosure, which is a test strip for measuring a concentration ratio between a first ion species and a second ion species contained in an electrolyte, can be produced with a small size while material solutions for forming ion-sensitive films do not come into contact with each other. The test strip manufacturing method of the present disclosure can produce such an electrolyte analysis test strip. The electrolyte analysis device of the present disclosure includes such an electrolyte analysis test strip and can measure a concentration ratio between the first ion species and the second ion species.

The above embodiments are illustrative, and are modifiable in a variety of ways without departing from the scope of this invention. It is to be noted that the various embodiments described above can be appreciated individually within each embodiment, but the embodiments can be combined together. It is also to be noted that the various features in different embodiments can be appreciated individually by its own, but the features in different embodiments can be combined.

The invention claimed is:

1. An electrolyte analysis test strip for measuring a concentration ratio between a first ion species and a second ion species contained in an electrolyte, the electrolyte analysis test strip comprising:

a substrate extending in one direction;

a first ion-sensitive film including a first material facing outwardly from the substrate in a specific region on one end side in the one direction on one main surface of the substrate and comes into contact with the electrolyte to generate a first potential corresponding to a concentration of the first ion species;

a first extraction electrode extending from the first ion-sensitive film to another end side opposite to the one end side on the one main surface;

a second ion-sensitive film including a second material facing outwardly from the substrate in a specific region on the one end side on an other main surface opposite to the one main surface of the substrate, and comes into contact with the electrolyte to generate a second potential corresponding to a concentration of the second ion species; and a second extraction electrode extending from the second ion-sensitive film to the other end side on the other main surface, wherein the substrate includes a first substrate and a second substrate, the one main surface is a surface being farther from the second substrate out of two main surfaces of the first substrate, the other main surface is a surface being farther from the first substrate out of two main surfaces of the second substrate, and an adhesive or a double-sided adhesive tape that integrally bonds the first substrate and the second substrate is disposed between a back surface opposite to the surface as the one main surface of the first substrate and a back surface opposite to the surface as the other main surface of the second substrate.

2. The electrolyte analysis test strip according to claim 1, wherein the electrolyte is urine, the first ion species is a sodium ion, and the second ion species is a potassium ion.

3. The electrolyte analysis test strip according to claim 1, wherein sensitivity of the first ion-sensitive film and sensitivity of the second ion-sensitive film are equivalent to each other, and selectivity of the first ion-sensitive film and selectivity of the second ion-sensitive film are equivalent to each other.

4. The electrolyte analysis test strip according to claim 1, wherein the substrate has, on the one end side in the one direction, a through-hole extending from the one main surface to the other main surface in a region other than a region occupied by the first and second ion-sensitive films and the first and second extraction electrodes.

5. The electrolyte analysis test strip according to claim 1, further comprising:

a permeable member formed of a material permeable to the electrolyte, wherein the permeable member spatially continuously covers the first ion-sensitive film and the second ion-sensitive film with lying across an end surface of the substrate from the one main surface to the other main surface.

6. An electrolyte analysis device for measuring a concentration ratio between a first ion species and a second ion species contained in an electrolyte, the electrolyte analysis device comprising:

the electrolyte analysis test strip according to claim 1; and a main body, the main body including a connector into which the other end side of the electrolyte analysis test strip is inserted, the connector including a first contact electrode and a second contact electrode that are in contact with the first extraction electrode and the second extraction electrode, respectively, and a calculation unit that calculates the concentration ratio between the first ion species and the second ion species contained in the electrolyte based on a potential difference between the first potential and the second potential obtained through the first contact electrode and the second contact electrode of the connector when the first and second ion-sensitive films of the electrolyte analysis test strip come into contact with the electrolyte.

7. A test strip manufacturing method for producing the electrolyte analysis test strip according to claim 1, the method comprising:

providing the first substrate and the second substrate;

forming the first extraction electrode extending from the specific region on the one end side to the other end side opposite to the one end side in the one direction on a surface as the one main surface of the first substrate;

forming the second extraction electrode extending from the specific region on the one end side to the other end side on a surface as the other main surface of the second substrate;

then applying a first material solution for the first ion-sensitive film onto a portion of the first extraction electrode, the portion formed in the specific region, on the surface as the one main surface of the first substrate, and drying and/or curing the applied first material solution to form the first ion-sensitive film including the first material;

applying a second material solution for the second ion-sensitive film onto a portion of the second extraction electrode, the portion being formed in the specific region, on the surface as the other main surface of the second substrate, and drying and/or curing the applied second material solution to form the second ion-sensitive film including the second material; and subsequently laminating and bonding, by an adhesive or a double-sided adhesive tape, the back surface opposite to the surface as the one main surface of the first substrate and the back surface opposite to the surface as the other main surface of the second substrate to each other, such that the first and second substrates are integrated as the substrate.

* * * * *